(12) United States Patent
Elkington et al.

(10) Patent No.: US 7,974,153 B2
(45) Date of Patent: Jul. 5, 2011

(54) THREE-DIMENSIONAL SEISMIC SURVEY METHODS USING A PERTURBATION PATTERN TO PROVIDE BIN FRACTIONATION

(75) Inventors: Gary J. Elkington, Houston, TX (US); Roy Malcolm Lansley, Bellville, TX (US)

(73) Assignee: Geokinetics Acquisition Company Inc., Houston, TX (US)

( * ) Notice: Subject to any disclaimer, the term of this patent is extended or adjusted under 35 U.S.C. 154(b) by 838 days.

(21) Appl. No.: 11/904,563

(22) Filed: Sep. 27, 2007

(65) Prior Publication Data

US 2008/0080309 A1    Apr. 3, 2008

Related U.S. Application Data

(60) Provisional application No. 60/848,281, filed on Sep. 29, 2006.

(51) Int. Cl.
*G01V 1/00* (2006.01)

(52) U.S. Cl. ............................................. 367/56; 367/58

(58) Field of Classification Search ............... 367/62, 367/61, 56, 58
See application file for complete search history.

(56) References Cited

U.S. PATENT DOCUMENTS

| | | |
|---|---|---|
| 4,001,770 A | 1/1977 | Hofer |
| 5,029,145 A | 7/1991 | Marsden et al. |
| 5,402,391 A | 3/1995 | Cordsen |
| 5,487,052 A | 1/1996 | Cordsen |
| 5,511,039 A | 4/1996 | Flentge |
| 5,598,378 A | 1/1997 | Flentge |
| 6,018,497 A | 1/2000 | Gunasekera |
| 6,026,059 A | 2/2000 | Starr |
| 6,028,822 A | 2/2000 | Lansley et al. |
| 6,510,390 B1 | 1/2003 | Bunting et al. |
| 7,768,872 B2 * | 8/2010 | Kappius et al. ............. 367/56 |

OTHER PUBLICATIONS

Lee W. Young, International Search Report, Mar. 10, 2008.
Randy L. Nickerson, Guillaume Cambois; "AVO attribute analysis on marginal 3-D land data improved target selection in the Sacramento Basin"; Dec. 1998, Leading Edge, pp. 1672-1677.
Finley, Robert J., Fate, Thomas H., Byrer, Charles W.; "Staggered-line 3-D Seismic Recording"; A Technical Summary of Research Conducted for Gas Research Institute, the U.S. Department of Energy and State of Texas by the Bureau of Economic Geology, The University of Texas at Austin, pp. 1-12.

(Continued)

*Primary Examiner* — Mark Hellner
(74) *Attorney, Agent, or Firm* — Karen B. Tripp

(57) ABSTRACT

A receiver point arrangement is deployed having one or more receiver lines, each receiver line having receivers with substantially uniform inline spacing. A seismic source is triggered at each source point in an arrangement of source points along one or more source lines, each source line having source points with substantially uniform crossline spacing. Seismic data traces are collected, each trace having an associated midpoint. A perturbation pattern is applied to at least one of the receiver point arrangement and the source point arrangement to distribute the midpoints evenly within a bin having dimensions of half the receiver inline spacing and half the source crossline spacing across multiple locations within that bin. The fractionation in the crossline and inline directions is determined by the interaction between the number of offset positions in the receiver point arrangement and number of offset positions in the source point arrangement, respectively; phase shifts of the perturbation pattern between adjacent receiver lines and between adjacent source lines, respectively; and crossline and inline fold, respectively, of a recording patch employed.

8 Claims, 28 Drawing Sheets

OTHER PUBLICATIONS

Cooper, Norman M., "3-D Design, Theory and Practice Using FDtools and FD", Sep. 16-17, 1991, Two Day Course, Seismic Image Software Ltd and Mustagh Resources Ltd., Calgary, Alberta, Canada, 1 page Cover, 2 pages Outline, 1 page Preamble and pp. 1-46.

Cooper, Norman M., "Introduction to Seismic Methods", Apr. 26-30, 1993, Two Day Course, Seismic Image Software Ltd and Mustagh Resources Ltd., Calgary, Alberta, Canada, 1 page Cover, and pp. 274-282.

* cited by examiner

THREE-DIMENSIONAL SEISMIC SURVEY METHODS USING A PERTURBATION PATTERN TO PROVIDE BIN FRACTIONATION

CROSS-REFERENCE TO RELATED APPLICATIONS

This application claims priority under 35 U.S.C. 119(e) to U.S. provisional application Ser. No. 60/848,281, filed on Sep. 29, 2006, entitled "Three-Dimensional Seismic Survey Methods Using a Perturbation Pattern to Provide Bin Fractionation", the disclosure of which is incorporated herein by reference in its entirety.

STATEMENT REGARDING FEDERALLY SPONSORED RESEARCH OR DEVELOPMENT

Not applicable.

BACKGROUND

Petroleum companies frequently use seismic surveys in their search for exploitable petroleum reservoirs. A seismic survey is an attempt to map the subsurface of the earth by sending sound energy down into the ground and recording the "echoes" that return from the rock layers below. The source of the down-going sound energy might come from explosions or seismic vibrators on land, and air guns in marine environments. During a seismic survey, the energy source is moved across the surface of the earth above the geologic formations of interest. Each time the source is triggered, it generates a seismic signal that travels downward through the earth and is partially reflected from boundaries between different rock types. These reflections cause sound energy waves to return toward the surface where they are detected by a set of spaced geophones or seismic energy receivers. The receivers generate electrical signals representative of the sound energy arriving at their locations.

The acoustic energy detected by the seismic receivers is generally amplified and then recorded or stored in either analog or digital form on some storage medium. The recording is made as a function of time after the triggering of the source. The recorded data may be transported to a computer and displayed in the form of traces, i.e., plots of the amplitude of the reflected seismic energy as a function of time for each of the geophones or seismic energy receivers. Such displays or data subsequently undergo additional processing to simplify the interpretation of the arriving acoustic energy at each seismic receiver in terms of the subsurface layering of the earth's structure. Data from multiple explosion/recording location combinations are combined to create a nearly continuous profile of the subsurface that may extend for many miles.

Survey types are often distinguished in terms of the pattern of recording locations on the earth's surface. As viewed from above, the recording locations may be laid out in a (one-dimensional) straight line, in which case the result is a two-dimensional (2-D) seismic survey. A 2-D survey can be thought of as a cross-sectional view (a vertical slice) of the earth formations lying underneath the line of recording locations. Alternatively, the recording locations may be laid out in a two-dimensional pattern on the surface, in which case the result is a three-dimensional (3-D) seismic survey. A 3-D survey produces a data "cube" or volume that is, at least conceptually, a 3-D picture of the subsurface that lies beneath the survey area.

3-D seismic surveys have become commonplace due to the comprehensive information they provide about the earth's subsurface. 3-D seismic surveys are generally performed using what is called the "swath method". In using the swath method on land, a number of very long (e.g., on the order of 3000-30,000 feet) receiver lines, each containing uniformly spaced receivers, are placed in parallel on the surface above and around the subsurface formations to be surveyed. Limitations on the data recording equipment and other economic considerations frequently limit the number of receiver lines and the number of receivers on each line that can be used to perform the survey. After the receiver lines have been placed, a seismic source is activated at each of various uniformly spaced locations (source stations) to impart desired shock waves into the earth.

The spot halfway between the source and a receiver (the "midpoint") has a particular significance in seismic surveys. If the subsurface formations were made up of flat layers parallel to the seismic source/receiver arrangement, the receiver's response to a firing of the source represents the reflections from formations directly below the midpoint. Even when subsurface formations do not adhere to the ideal, the reflections from below the midpoint can be reinforced and extraneous reflections (and random noise) can be attenuated by "stacking" receiver responses that share a common midpoint. Stacking involves time-scaling the receiver responses to account for travel time differences (e.g., when one source-receiver pair is more widely spaced than another), and averaging the results. Prestack processing and interpolation techniques may also be employed, depending upon the nature of the seismic data and the targets under investigation. Migration processing techniques may also be employed to further refine and enhance the acquired data.

To enable stacking, existing 3-D seismic survey methods design the seismic receiver point arrangement and the pattern of source firings in a manner that causes many source-receiver pairs to share common midpoints. The number of receiver responses sharing a common midpoint is known as the multiplicity, or "fold", so that, e.g., four receiver responses sharing a common midpoint represent a four-fold response at that midpoint. In existing seismic survey methods, the receivers and source firings are arranged in uniformly spaced grids to maximize the fold in view of the desired resolution and various constraints on the number of receivers and source firings.

The receiver point arrangement may be used to define the survey coordinate system, with the direction of the receiver lines being termed the "inline" direction, and the direction perpendicular to the receiver lines being termed the "crossline" direction. Generally, the survey volume is divided into constituent "bins" having a length and a width based on the desired resolution of the resulting 3-D picture. The length and width of the bins are determined by the source and receiver spacings. Within the horizontal extent defined by the length and width of a bin, existing survey methods provide a single common midpoint where the receiver responses may be stacked to maximize the fold.

In U.S. Pat. No. 5,402,391, Cordsen discloses a method of distributing midpoints more evenly within a constituent bin to enable a finer-grained optimization between fold (signal-to-noise ratio) and resolution. As disclosed therein, the distributed midpoints can be combined in different groupings, with larger groupings having increased fold (higher signal-to-noise ratio) at the cost of a larger bin size (lower resolution). This enhanced flexibility may provide insurance, enabling survey data to still be used with acceptable spatial resolution even when survey conditions were noisier than anticipated. In U.S. Pat. No. 5,511,039, Flentge discloses an alternative method of providing such a distribution of midpoints within constituent bins (herein termed "bin fractionation"). Further, bins could be similarly fractionated by using variable intervals between adjacent source or receiver points. However, with current recording systems and methodologies, such techniques would not be deemed efficient for field acquisition.

In both the Cordsen and Flenge methods, the receivers and source firings are maintained in straight lines and at regular intervals along those lines. In some cases, such straight lines can be undesirable. For example, in forested or jungle areas, some clearing of growth may be needed to lay out the receiver strings. When the receiver lines or source lines are straight, the resulting cuts in the forest may extend for miles in straight lines. Such cuts create undesirable environmental impact by creating sightlines that encourage public access to isolated areas.

Thus, a need exists for an alternative bin fractionation method for three-dimensional seismic surveys.

SUMMARY

The invention is a method for providing bin-fractionation for a three-dimensional seismic survey. In one embodiment, a receiver point arrangement is deployed having one or more receiver lines, each receiver line having receivers with substantially uniform inline spacing. A seismic source is triggered at each source point in an arrangement of source points along one or more source lines, each source line having source points with substantially uniform crossline spacing. Seismic data traces are collected, each trace having an associated midpoint. A perturbation pattern is applied to at least one of the receiver point arrangement and the source point arrangement to distribute the midpoints evenly within a bin having dimensions of half the receiver inline spacing and half the source crossline spacing across multiple locations within that bin. The fractionation in the crossline and inline directions is determined by the interaction between the number of offset positions in the receiver point arrangement and number of offset positions in the source point arrangement, respectively; phase shifts of the perturbation pattern between adjacent receiver lines and between adjacent source lines, respectively; and crossline and inline fold, respectively, of a recording patch employed.

BRIEF DESCRIPTION OF THE DRAWINGS

A better understanding of the present invention can be obtained when the following detailed description of the preferred embodiment is considered in conjunction with the following drawings, in which:

FIG. 16B illustrates the resulting folds in the fractionated sub-bins corresponding to FIG. 16A;

FIG. 17B illustrates the resulting folds in the fractionated sub-bins corresponding to FIG. 17A.

Figure 1:
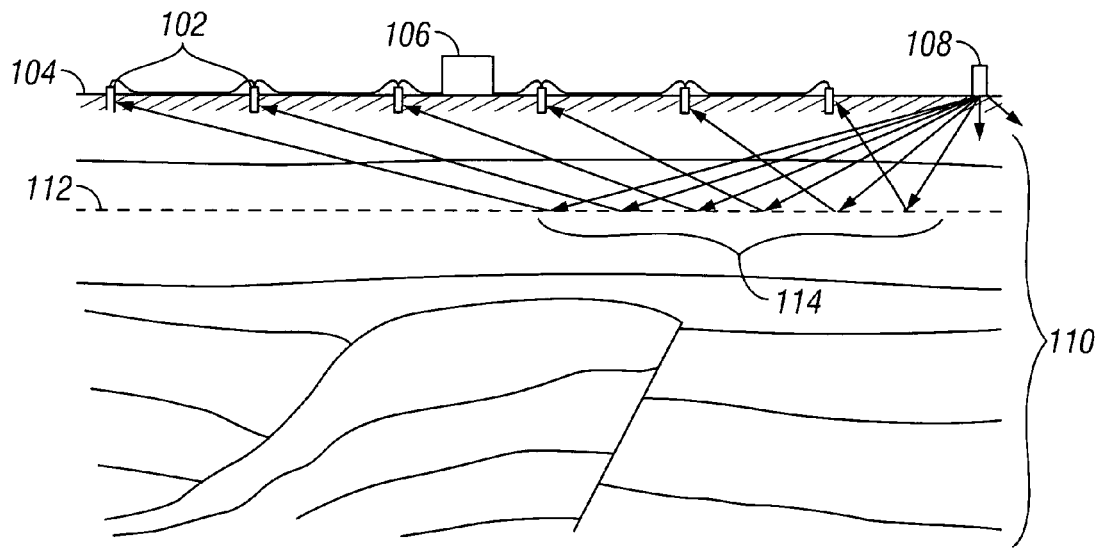
FIG. 1 shows an illustrative environment for obtaining a seismic survey.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Disclosed herein are systems and methods for obtaining bin-fractionated, 3-D seismic survey data. FIGS. 1-3C are first described to explain elements of various systems and methods with which the disclosed pattern perturbations techniques may be practiced. FIGS. 4A-7 are then used to describe the pattern perturbation techniques in detail.

Seismic data are derived from seismic surveys, which may be obtained as shown in FIG. 1. FIG. 1 shows a set of seismic energy receivers 102 positioned in a spaced-apart arrangement on the earth's surface 104. The receivers 102 are coupled to a recording unit 106 that records the data collected by the receivers. A seismic energy source 108 is triggered to generate sound waves that propagate into the earth 110 as shown by the arrows emanating from source 108. The sound waves that reach the receivers 102 from any particular horizon 112 of the earth 110 do so via partial reflections below the midpoints between that receiver and the source 108. The reflection intensity is indicative of changes in acoustic impedance such as those that may arise at boundaries between different formations. The receivers 102 receive the reflected seismic waves and convert them into electrical signals for storage by recording unit 106.

The source 108 may be repeatedly triggered at different locations relative to the arrangement of receivers 102. The seismic data traces from multiple firings may be recorded separately and later combined to screen out random noise and undesirable interference caused by secondary echoes of reflected waves. The data may then be processed to identify the features of the subsurface layers 112. Features of particular interest may include faults and other changes in the layers.

Figure 2:
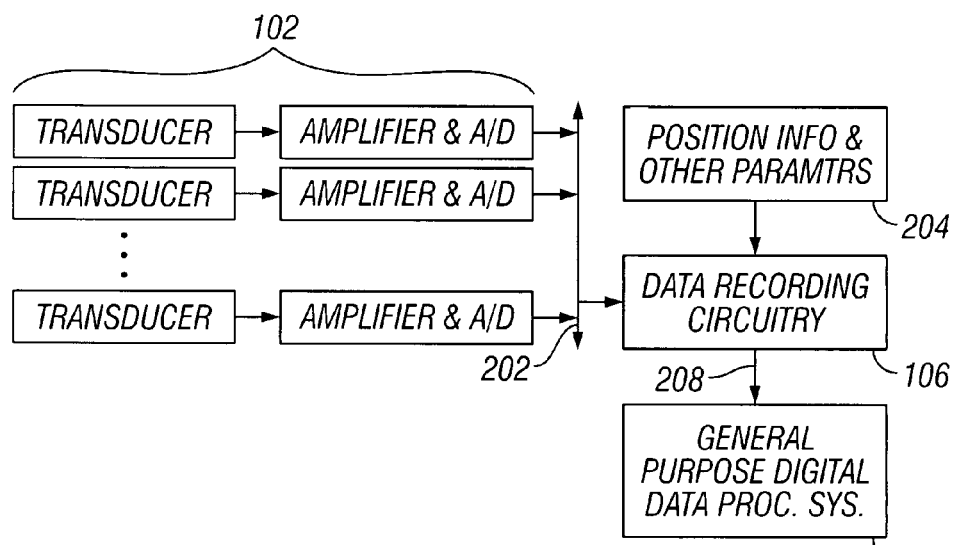
FIG. 2 shows a block diagram of an illustrative seismic surveying system.

FIG. 2 shows an illustrative block diagram of seismic survey system electronics. The receivers 102 include transducers to convert the seismic wave energy into electric signals, and may further include electronics to filter, amplify, and convert the electric signals into digital data. The digital data may be communicated to the recording unit 106 via a bus 202, or alternatively may be communicated via a dedicated information pathway or via a wireless connection. The recording unit 106 stores the digital data on an information storage medium, along with position information for each of the receivers and any other parameters that may be useful in interpreting the stored data. The location information and other parameters may be provided via an independent interface 204 such as a user interface that allows manual entry of such information, or a global positioning system (GPS) interface that collects such information from one or more GPS receivers.

Recording unit 106 may use any suitable information storage medium. Due to the large volume of information to be stored, the information storage medium is generally some form of magnetic medium, e.g., disk drives or magnetic tape. However it is expected that the necessary storage capacity may also be provided by optical media or integrated circuit memories. In an alternative embodiment, recording unit 106 simply gathers the data from the receivers and transmits the data in real time to a remote location such as a central storage facility.

The data collected by recording unit 106 may be communicated to a general purpose digital data processing system 206. The communication may take place in any of various ways, including transmission via a wired or wireless communications link, and by physical transport of an information storage medium. System 206 may process the traces to perform common midpoint trace stacking or other prestack processing and to apply corrections to the traces for such effects as wave propagation delays. In performing such processing, the traces may be grouped in a manner that maximizes resolution while assuring adequate signal to noise ratio. Resampling of the data may be performed to obtain evenly-spaced, time- or depth-synchronized samples on each of the traces, and to obtain estimated traces at interpolated positions within the receiver point arrangement. For viewing and analysis, the trace data may also be converted into any number of seismic attribute measurements including without limitation phase, peak amplitude, sound velocity, acoustic impedance, rock porosity, water saturation, and hydrocarbon content.

Figure 3A:
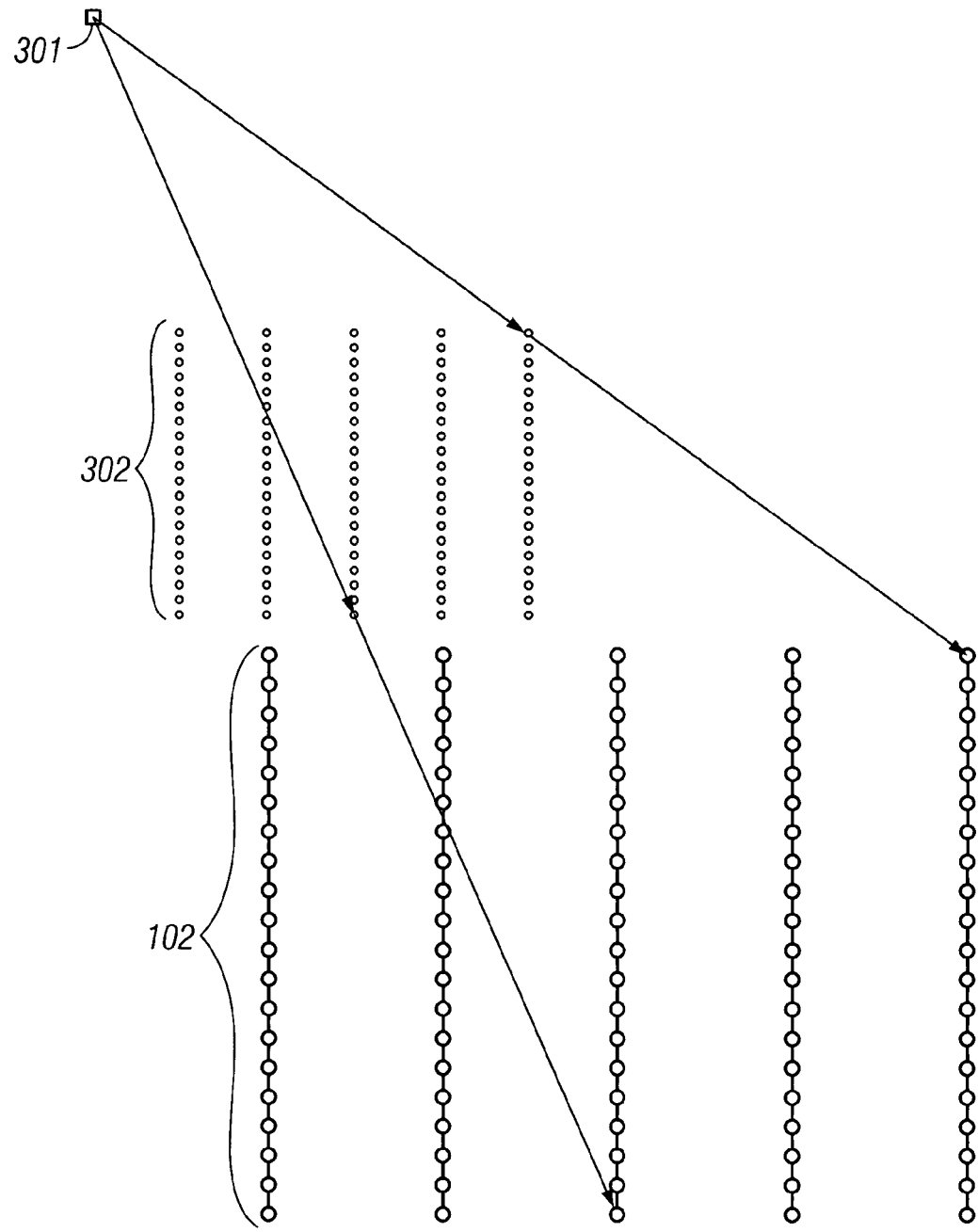
FIGS. 3A-3C demonstrate an illustrative seismic survey method for providing an increased multiplicity of midpoints within a standard bin.

FIG. 3A shows an overhead view of an illustrative 3-D seismic recording arrangement. Receivers 102 are shown organized into uniformly spaced lines of uniformly spaced receivers. A seismic source firing point 301 is also shown. When the seismic source is triggered, the receivers 102 each receive reflections from formations below a corresponding midpoint 302. Note that the firing point 301 is shown at an exaggerated distance for illustrative purposes so that the various resulting midpoints 302 do not overlap with the receiver point arrangement. In practice the source firing point 301 may be much closer to, or within the boundaries of, the receiver point arrangement.

Figure 3B:
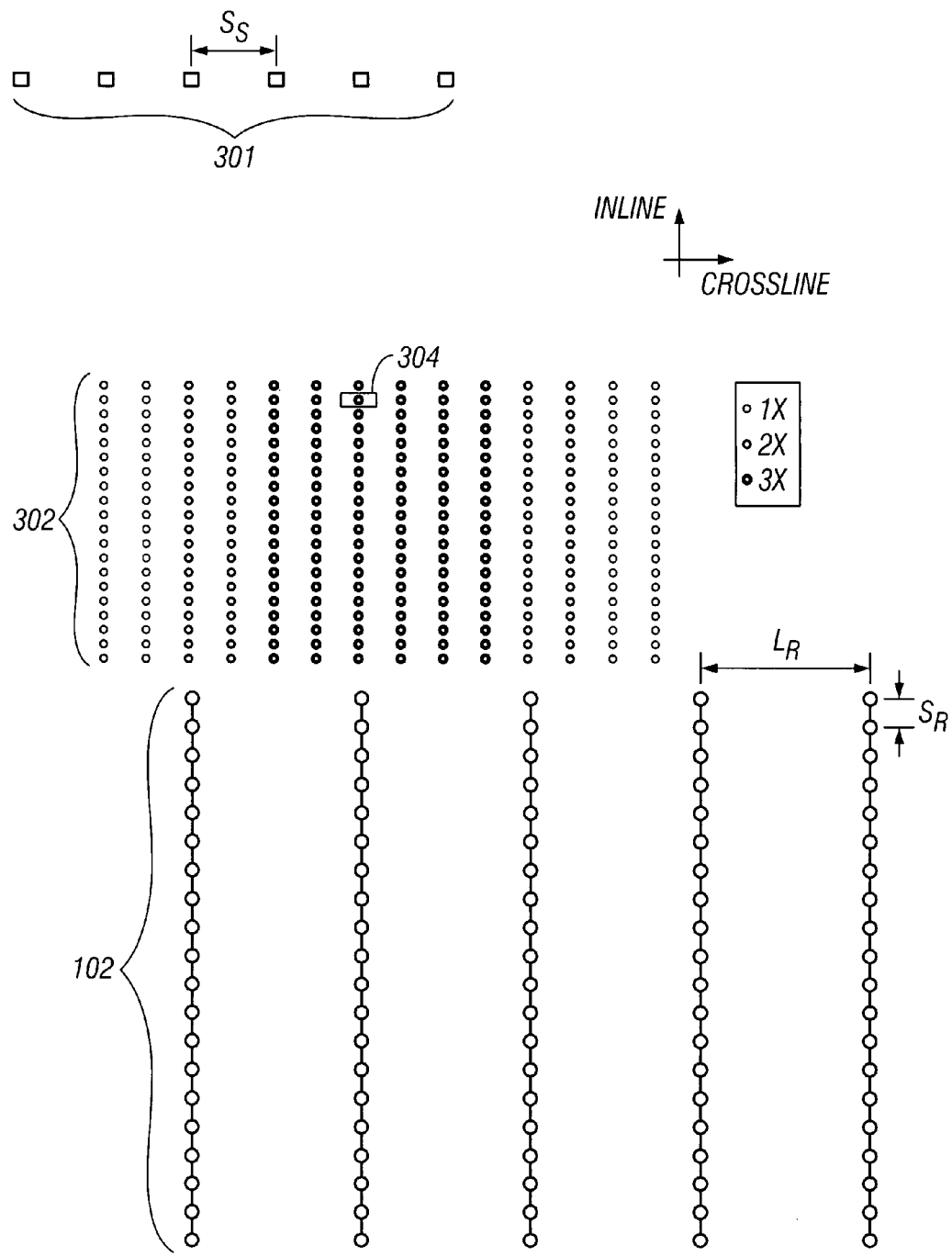

Wave propagation rays are shown for two illustrative receivers. Note that the arrangement of receivers 102 reproduces itself half-scale in the arrangement of midpoints 302. This arrangement gets shifted and repeated for different source firing locations 301 as shown in FIG. 3B. FIG. 3B shows the arrangement of midpoints 302 that results from six uniformly spaced firing points 301. Note that most of the midpoints overlap. This overlap results from the relationship between the source spacing $S_S$ and the receiver line spacing $L_R$. In the illustrated arrangement the receiver line spacing $L_R$ is equal to twice the source spacing $S_S$, but (assuming a large enough source point arrangement) such overlap will result from a receiver line spacing that is any positive integer multiple of the source spacing. The midpoints shown in heavier lines represent a two-fold subsurface coverage, whereas the midpoints shown in lighter lines represent a one-fold coverage. The midpoints shown in the heaviest lines represent three-fold coverage.

The survey volume is divided into constituent bins 304 having a horizontal extent of one half the receiver inline spacing $S_R$ (i.e., the spacing in the inline direction) by one half of the crossline source spacing $S_S$. The multiple common midpoint reflections within a given bin may result not only from shifting the midpoint pattern in the crossline direction, but also from shifting the midpoint pattern in the inline direction as shown in FIG. 3C.

Figure 3C:
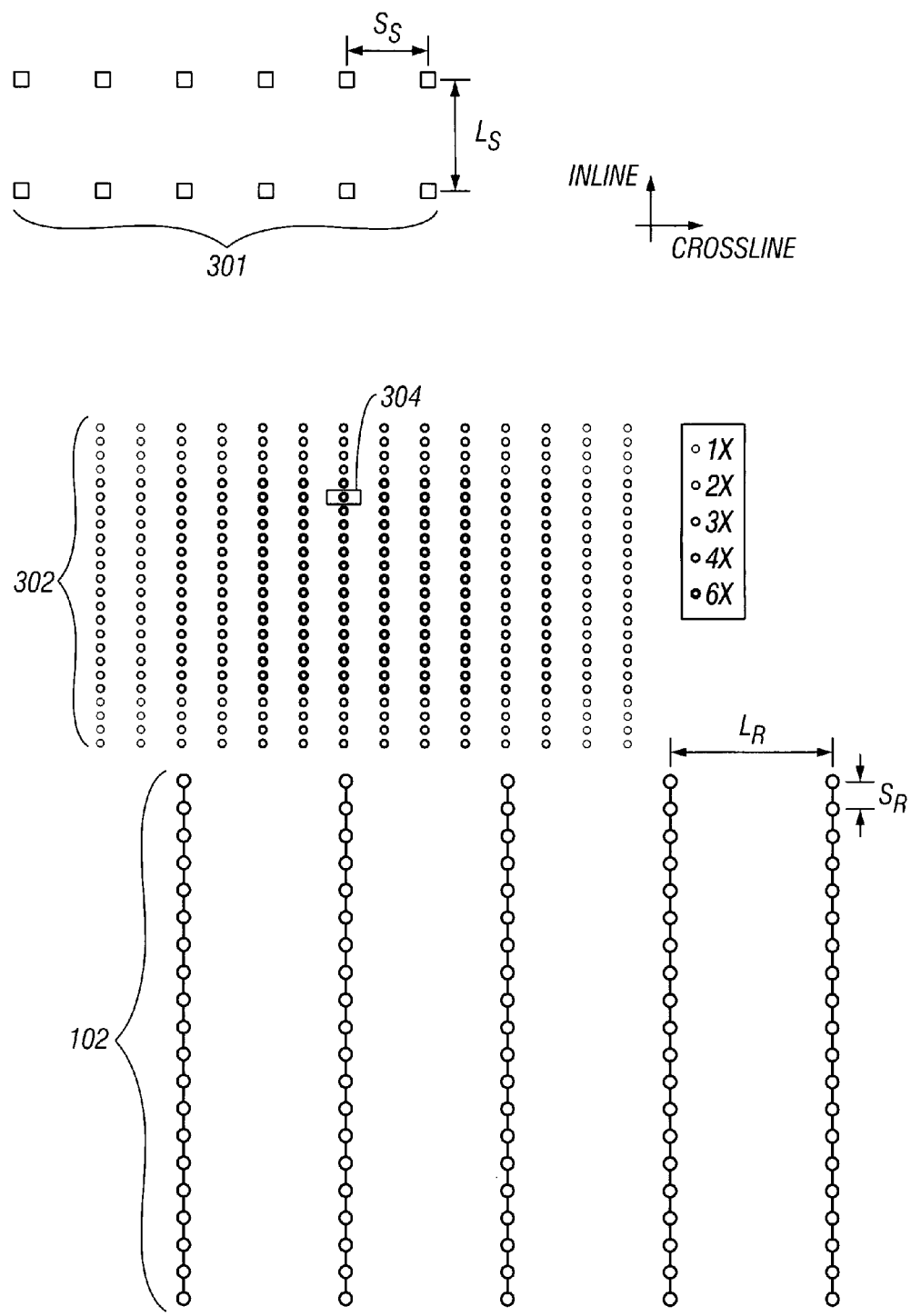

FIG. 3C shows the pattern of midpoints 302 resulting from a grid of firing points 301. The pattern shift in the inline direction by an integer multiple of the receiver spacing $S_R$ has increased the number of reflections to six-fold. Extending the firing grid pattern in both the inline and crossline directions would result in a multiplicity of up to 25-fold. The maximum multiplicity for a given arrangement of receivers and firing points is a function of the extent of the receiver point arrangement (the "patch" size), the ratio of source line spacing $L_S$ to receiver spacing $S_R$, and the ratio of receiver line spacing $L_R$ to source spacing $S_S$.

Figure 4A:
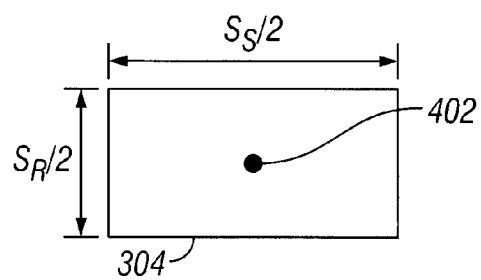
FIGS. 4A-4E demonstrate distributions of common midpoints within constituent bins.
Figure 4B:
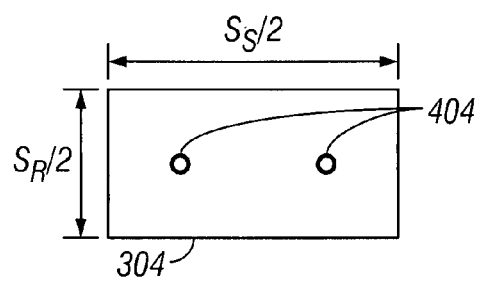
Figure 4C:
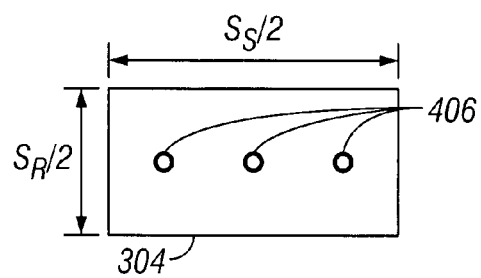

The multiplicity of midpoint reflections from a given bin 304 can be traded-off against a patterned or specific distribution of midpoint reflections within that bin, a practice herein termed "bin fractionation". FIG. 4A shows a bin 304 from the example of FIG. 3C in which the midpoint reflections are all concentrated at one point 402 within the bin. FIG. 4B shows an example in which the multiple midpoint reflections are split into two groups 404 within the bin 304. FIG. 4C shows an example in which the multiple midpoint reflections are distributed across three points 406 within the bin 304. In the examples of FIGS. 4B and 4C, the splitting is performed in the crossline direction.

Figure 4D:
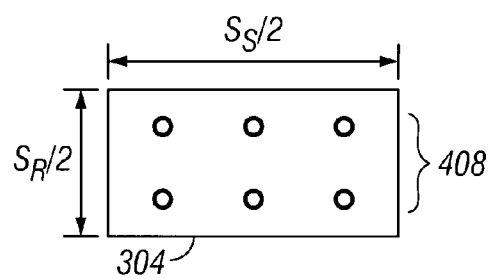
Figure 4E:
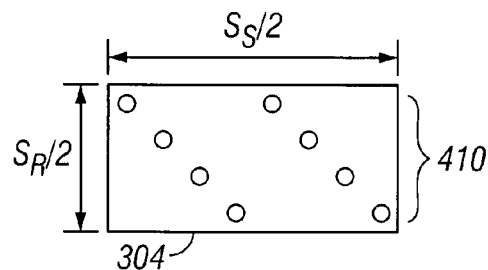

Splitting can also or alternatively be performed in the inline direction. FIG. 4D shows an example in which the multiple midpoint reflections are split three ways in the crossline direction and two ways in the inline direction, thereby distributing midpoint reflections across six points 408 within the bin 304. Although they may generally be preferred, uniform grid-like distributions of bin fractionation points are not required. An example of a non-uniform distribution of reflections across eight points 410 is shown in FIG. 4E.

To perform splitting in an inline direction, a perturbation pattern may be applied to the source firing points to shift these firing points in an inline direction. Similarly, a perturbation pattern may be applied to the receiver lines to shift receivers in a crossline direction, thereby splitting midpoint reflections in a crossline direction. An important consideration when perturbing the receivers is the maximum take-out distance, i.e., the maximum distance at which a receiver can be located from a connection point to the recording equipment. The perturbation pattern should be designed relative to a the arrangement of connection points to avoid exceeding the maximum take-out distance.

Figure 5A:
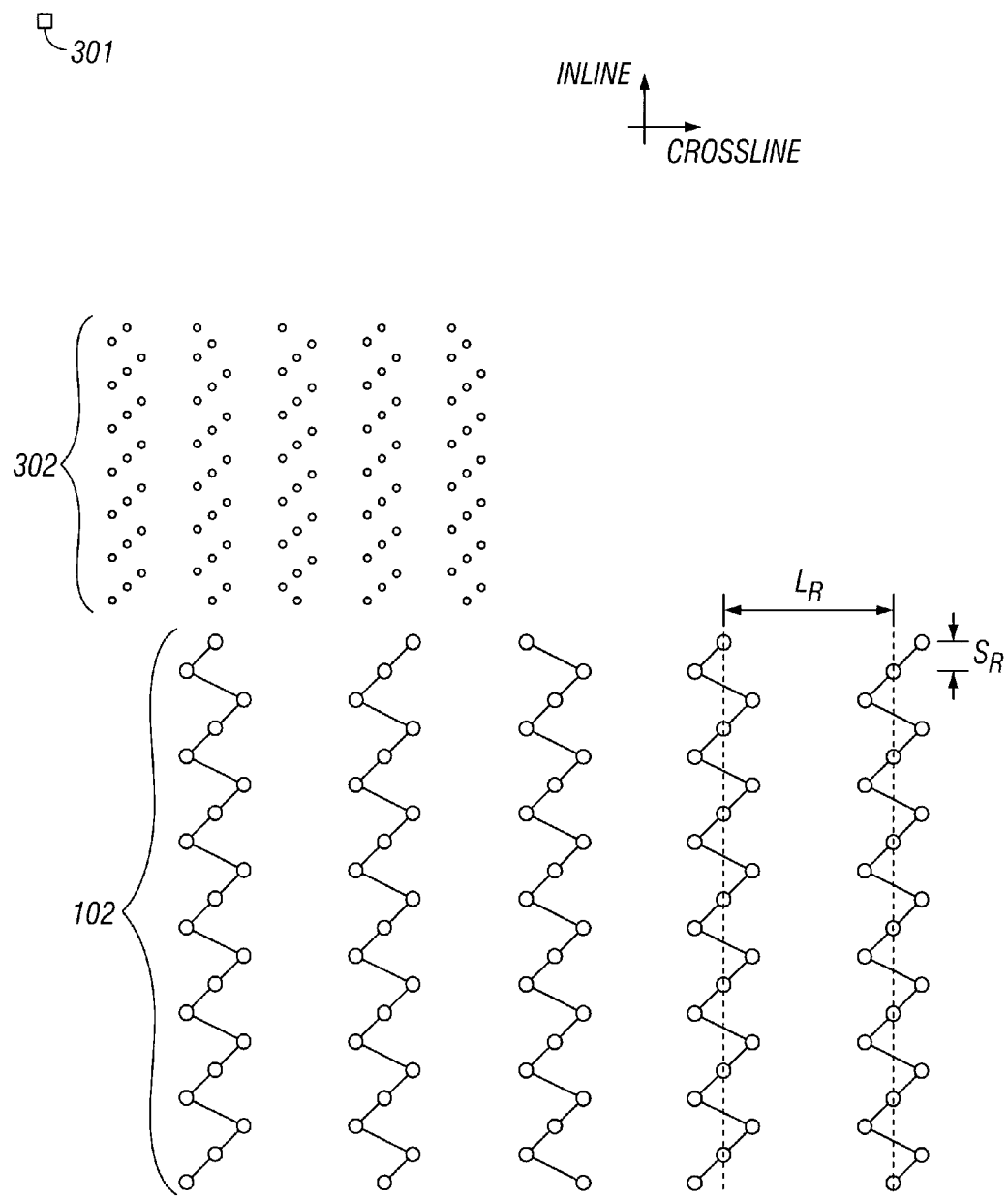
FIGS. 5A-5C demonstrate an illustrative seismic survey method for distributing multiple midpoints within a standard bin.

FIG. 5A shows an overhead view of an illustrative 3-D seismic recording arrangement using a perturbation pattern. Receivers 102 are again arranged in uniformly-spaced lines with receiver line spacing $L_R$ (in the crossline direction) of uniformly spaced receivers with receiver spacing $S_R$ (in the inline direction), but the lines now exhibit a cross-line perturbation pattern that is reproduced in the arrangement of midpoint reflections 302. The perturbation pattern includes three different crossline offsets from a receiver line baseline, which (under the proper conditions described further below) will provide a three-way crossline split in the midpoint reflection arrangement that results from shifting the firing points 301 in the inline direction. Note that in this example the perturbation patterns of adjacent receiver lines are shifted in phase by one receiver spacing $S_R$. However, this phase shifting is not a requirement of the invention, but depends upon the source point arrangement, recording patch, and receiver line interval. This phase shifting of the perturbation patterns is one of several factors that can be employed to provide consistent bin fractionation. These factors will be described in detail later.

Figure 5B:
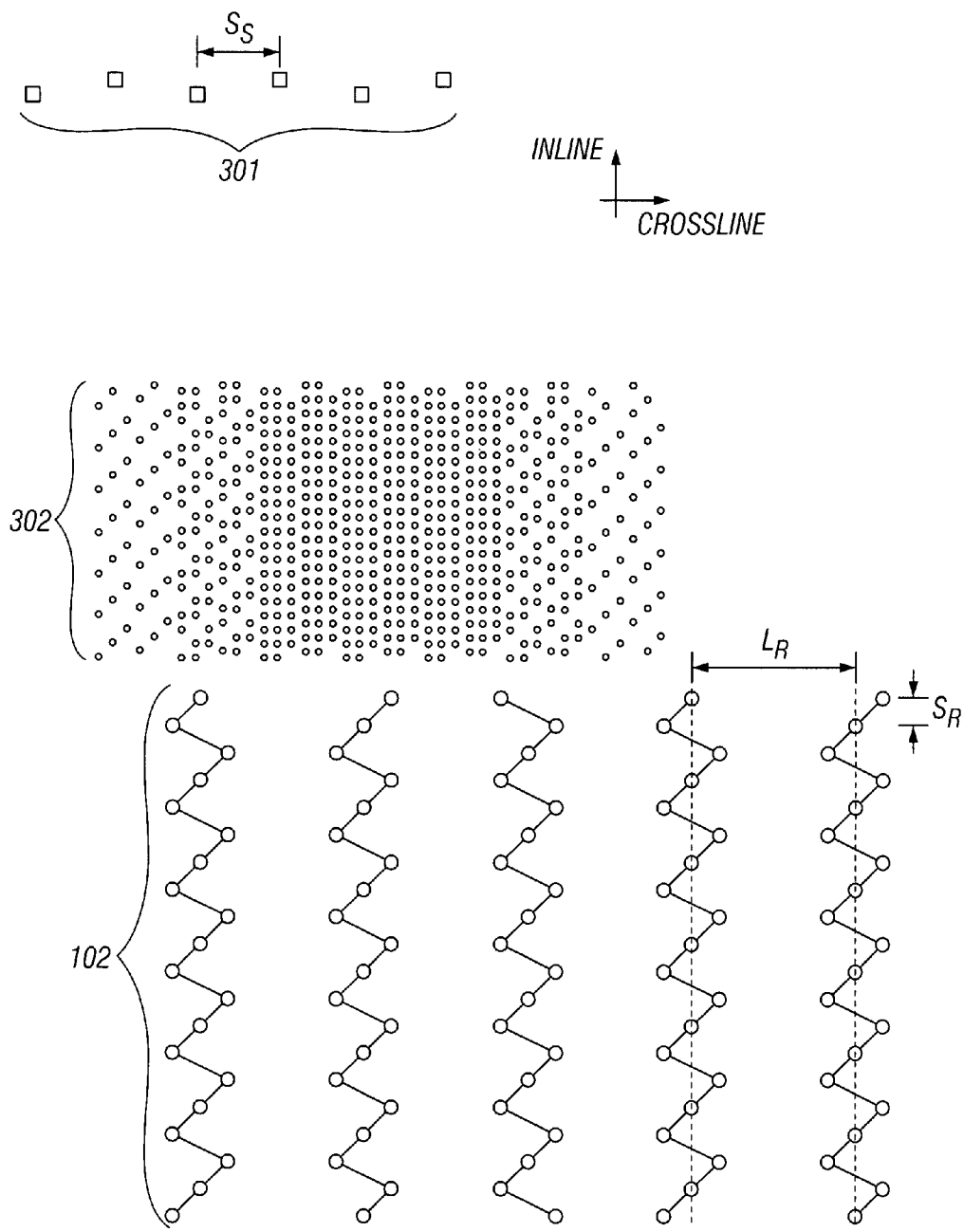
Figure 5C:
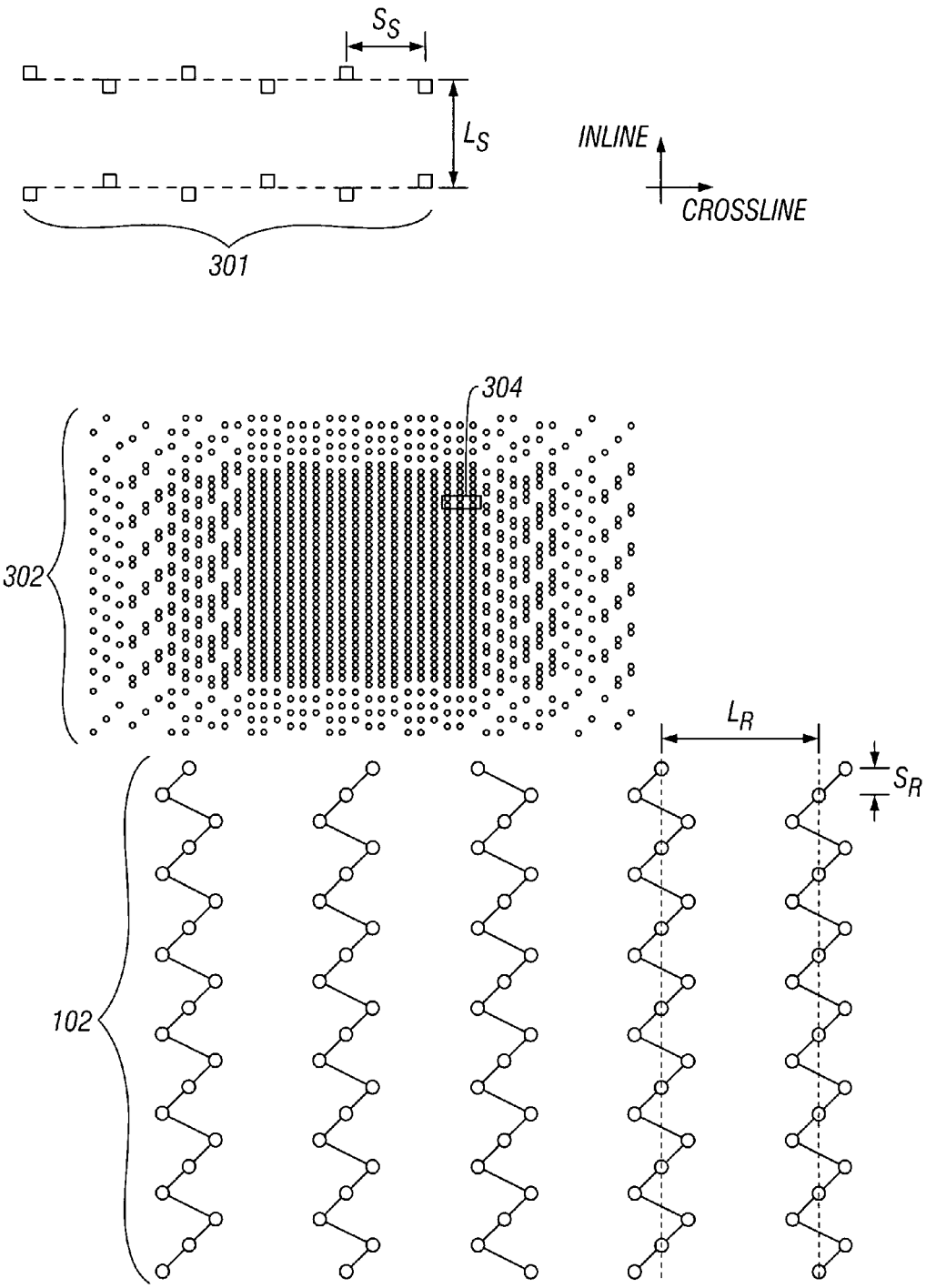

FIGS. 5B and 5C show an arrangement of source firing points 301 that also exhibits a perturbation pattern. The arrangement of FIG. 5C shows that the source firing points are arranged in uniformly spaced lines of uniformly spaced firing points, but the lines now exhibit an inline perturbation pattern, with a phase shift of one source spacing $S_S$ between adjacent source lines. The perturbation pattern has two different offsets from the source line baseline, which under the proper conditions will provide a two-way split in the midpoint reflection arrangement. The two-way inline split can best be seen in FIG. 5B. As the source firing point is shifted in a crossline direction, the inline perturbation adjusts the midpoint reflection arrangement to avoid perfect alignment of the midpoint reflections (e.g., the alignment that increases the fold as shown in FIG. 3B).

Similarly, as the source firing points are shifted in the inline direction, the crossline perturbation of the receivers distributes the midpoint reflections in a three-way split that becomes evident on the left edge of the midpoint reflections 302 in FIG. 5C. In the regions away from the edges, the standard bin 304 exhibits the six-way split previously described with reference to FIG. 4D. FIG. 5C may be contrasted with FIG. 3C to observe how the application of the disclosed perturbation patterns allows a fixed number of source points and receivers to provide measurements over a more finely distributed arrangement of midpoints.

Because the disclosed bin fractionation technique trades multiplicity (fold) for improved spatial resolution, the signal to noise ratio for measurements relating to a given midpoint is reduced. The explorationist can optimize this tradeoff by grouping neighboring midpoints together and combining their measurements. This decision can be made and changed while analyzing the data on a general purpose computer 206 (in FIG. 2), i.e., after the survey work has been completed.

FIGS. 3C and 5C reveal the phenomenon of "edge effects". The regions near the edges of a given survey area always lack sufficient reflections to provide full coverage. The edge-effect problem can be addressed by ensuring that the survey area extends sufficiently beyond the particular region of interest. The following analysis applies to the full-coverage regions.

Figure 6:
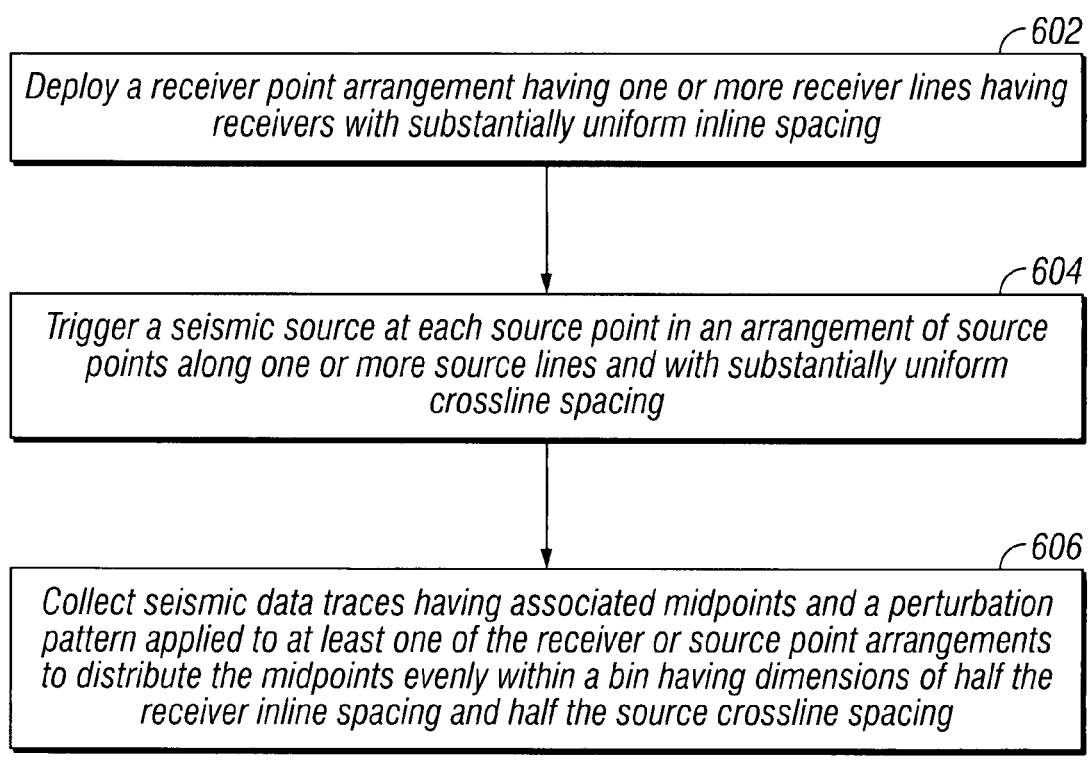
FIG. 6 shows a flowchart illustrating an embodiment of the method of the invention for providing bin fractionation for a seismic survey.

FIG. 6 shows a flowchart illustrating an embodiment of the invention for providing bin fractionation for a three-dimensional seismic survey. In block 602, a receiver point arrangement is deployed having one or more receiver lines. Each receiver line has receivers with substantially uniform inline spacing. In block 604, a seismic source is triggered at each source point in an arrangement of source points along one or more source lines. Each source line has source points with substantially uniform crossline spacing.

In block 606, seismic data traces are collected. Each trace has an associated midpoint. A perturbation pattern is applied to at least one of the receiver point arrangement and the source point arrangement to distribute the midpoints evenly within a bin having dimensions of half the receiver inline spacing and half the source crossline spacing across multiple locations within that bin. The fractionation in the crossline and inline directions is determined by the interaction between the number of offset positions in the receiver point arrangement and number of offset positions in the source point arrangement, respectively; phase shifts of the perturbation pattern between adjacent receiver lines and between adjacent source lines, respectively; and crossline and inline fold, respectively, of a recording patch employed.

Figure 7:
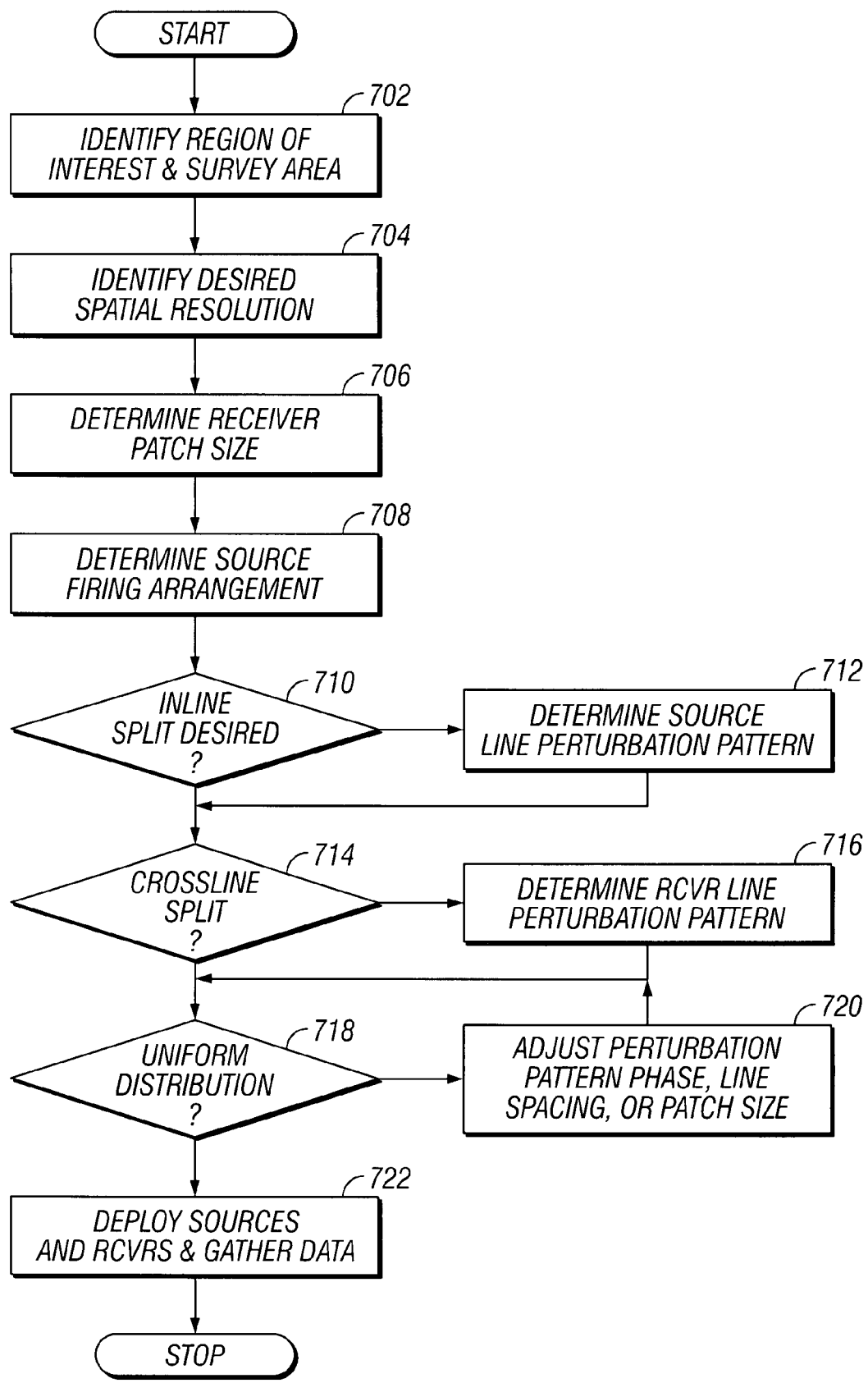
FIG. 7 shows a flowchart illustrating an alternative embodiment of the method of the invention for providing bin fractionation for a seismic survey.

FIG. 7 shows a flowchart illustrating an alternative embodiment of the method of the invention for providing bin fractionation for a seismic survey. In block 702, an explorationist identifies some region of interest and determines the appropriate survey area that enables data gathering throughout the region of interest. In block 704, a desired spatial resolution (i.e., the size of bin 304) is determined, thereby dictating the desired source and receiver spacings $S_S$ and $S_R$.

In block 706, the explorationist determines a size of the receiver point arrangement, i.e., the recording patch size. The receiver point arrangement size is determined based on a number of factors, including equipment limitations on the number of active receivers, the desired spatial resolution, the desired signal to noise ratio, and the survey strategy. This determination of point arrangement size determines, among other things, the number and spacing of the receiver lines. In block 708, the explorationist determines an arrangement of source firing points that will satisfy the survey requirements given the receiver point arrangement size. The arrangement determination includes, among other things, the number and spacing of source lines.

A check is made in block 710 to determine if it is desired to split the midpoints within each bin and distribute them in an inline direction. If so, the explorationist determines a perturbation pattern to be applied to the source lines as disclosed above. The chosen perturbation pattern may depend on the desired inline split number m, the receiver line spacing $L_R$, and the crossline fold contribution. A second check is made in block 714 to determine if it is desired to distribute the midpoints within each bin in a crossline direction. If so, the explorationist determines a perturbation pattern to be applied to the receiver lines as disclosed above. The chosen perturbation pattern may depend on the desired crossline split number p, the source line spacing $L_S$, and the inline fold contribution.

In block 718, a check or simulation of the survey is performed to determine whether the fractionated bins have consistent (uniform) fold levels. The interaction between perturbation patterns in the source and receiver lines, with or without phase shifts, may cause an uneven concentration of reflection points in neighboring fractionated bins. If an uneven distribution is detected, adjustments are made in block 720 to alter the phase shifts between perturbation patterns, to alter the perturbation pattern period, the receiver or source line spacing, or the patch size in an attempt to counter the uneven distribution. Blocks 718 and 720 may be repeated until a uniform distribution is obtained. Finally, in block 722, the receiver point arrangement is deployed in accordance with the chosen arrangement and perturbation pattern, and seismic data is gathered by firing the source at the desired source points with source perturbation pattern, if any. After being recorded, the data can be processed and analyzed in a manner that provides an optimal tradeoff between spatial resolution and signal to noise ratio.

The present invention is a method for designing patterns of sources and receivers that provide evenly (uniformly) fractionated bins. That is, the invention is a method for fractionating the bins so that the sub-bins all have the same fold. The invention fractionates the bins evenly by a procedure for perturbing the source line patterns and receiver line patterns. In the method of the invention, the source lines may be perturbed alone, the receiver lines may be perturbed alone, or both the source lines and the receiver lines may be perturbed together.

In general, in the method of the invention, the perturbations of the source and receiver lines are designed so that the resulting fractionation will divide the non-fractionated inline and crossline folds into fractionated integer values. For example, a non-fractionated inline fold of 10 or 12 would be divided by, say, 2 to yield a fractionated inline fold of 5 or 6, respectively. However, this use of integer fractionation is not to be considered a limitation of the invention, since non-integer fractionations can also be employed. Typically, though, consistent fold levels are desired.

Whether or not a specific pattern of source or receiver line perturbation according to the method of the invention yields a consistent (uniform) fold level in the resulting fractionated bins is a function of several factors acting in unison. In summary, whether or not a specific pattern yields a consistently even fold level in the fractionated bins is a function of at least the following factors: (1) the amount of fractionation from the natural bin size; (2) how the pattern varies between adjacent source or receiver lines; (3) the inline fold and crossline fold of the recording patch; (4) the integer or non-integer multiple of the period of perturbation pattern relative to the source or receiver line interval; and (5) how the perturbation pattern varies at the intersection with the source or receiver lines. The factors, discussed below, apply to both the source line and receiver line perturbations, whether applied separately or together.

Examples of source and receiver line perturbation patterns are illustrated in the following FIGS. 8A through 17B. The sources have 220 ft source intervals SS and 1760 ft source line intervals LS. The receivers also have 220 ft receiver group intervals SR and 1760 receiver line intervals LR. The recording patch is 12 lines with 96 receivers in a single line roll. This results in an inline fold of 6 and a crossline fold of 6, for a total fold of 36 in each bin before fractionation. Some examples will show the effect of substituting a recording patch with 10 lines instead of 12 lines. In the following figures that show source and receiver patterns, only a representative portion of the 10 or 12 line recording patch will be shown, for illustrative purposes. Not all 10 or 12 receiver lines will be shown in these figures.

A first factor is the amount of fractionation from the natural bin size. Perturbing the source lines fractionates (splits) the bin dimension in the inline direction, the receiver line orientation, yielding a new fractionated crossline fold. The number of different offset positions from (or on) the source line base line determines the amount of fractionation, as explained above with regard to the discussion of FIGS. 5A-5C. Similarly, perturbing the receiver lines splits the bin dimension in the crossline direction, orthogonal to the receiver line orientation.

A second factor, stated for the case of source line perturbation, is how the pattern of source line perturbation varies between adjacent source lines. In this case, the fractionation works in conjunction with the inline fold contributions to provide consistent fold levels. A similar factor, as stated for receiver line perturbation, is how the pattern of receiver line perturbation varies between adjacent receiver lines. In this case, the crossline fold will be effectively fractionated.

A primary example of this second factor is "mirroring" of adjacent source or receiver lines. Mirroring means phase shifting adjacent source or receiver lines to be mirror images of each other about a parallel line halfway between them. This mirroring is equivalent to a phase shift in the perturbation pattern by 180° between adjacent lines.

In the case of source line perturbation with a pattern of two offset positions being applied alone without an accompanying receiver line perturbation, adjacent source lines must be mirrored or phase shifted by 180°. This works if the receiver line interval is an integer multiple of the source perturbation period. Otherwise, only every other fractionated sub-bin will be filled in and consistently fractionated bins cannot be obtained. Similarly, in the case of receiver line perturbation being applied alone, adjacent receiver lines must be mirrored to obtain consistently fractionated fold. It will be seen below that phase shifts other than 180° are also a part of the method of the invention.

Figure 8A:
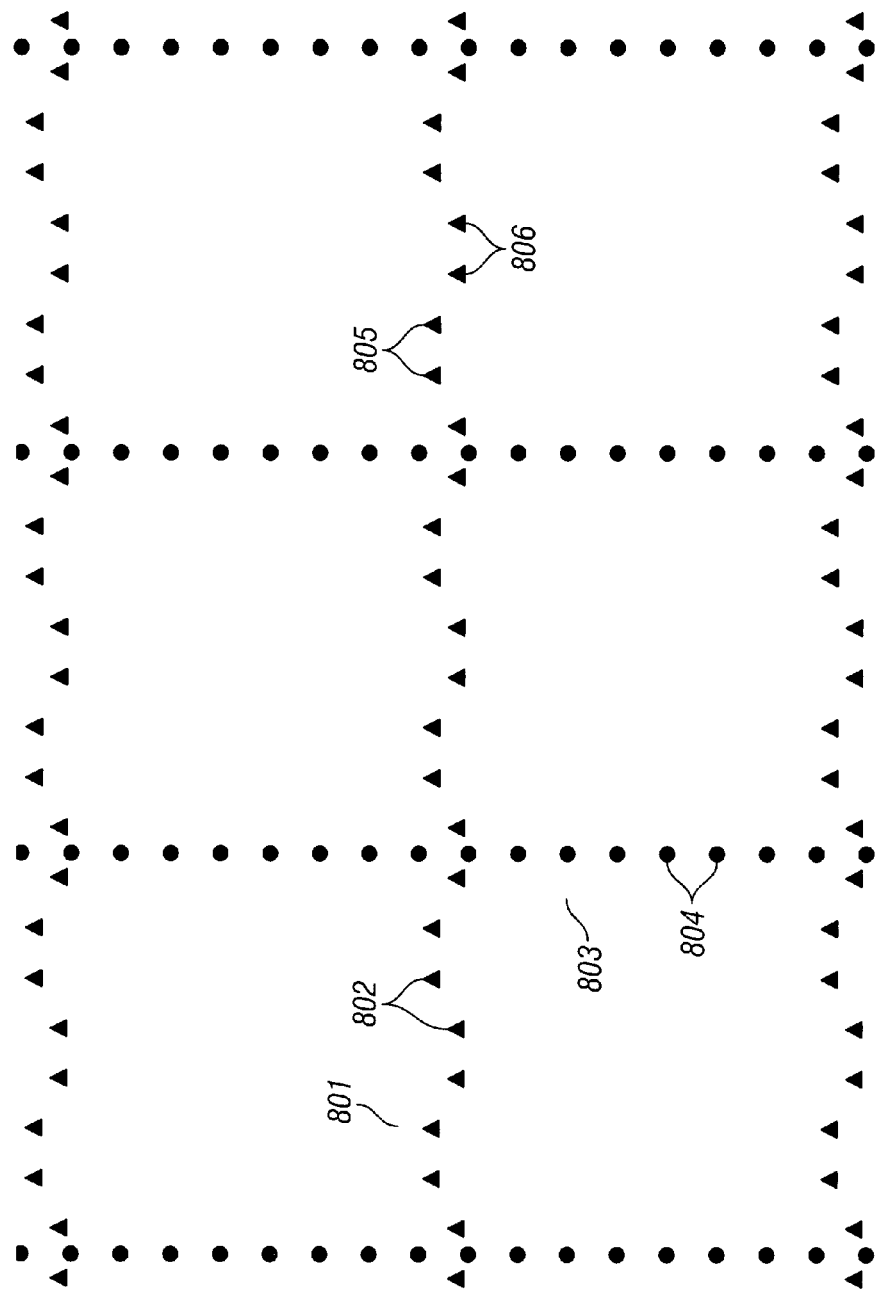
FIG. 8A illustrates a non-mirrored square source line perturbation with a period of four.
Figure 8B:
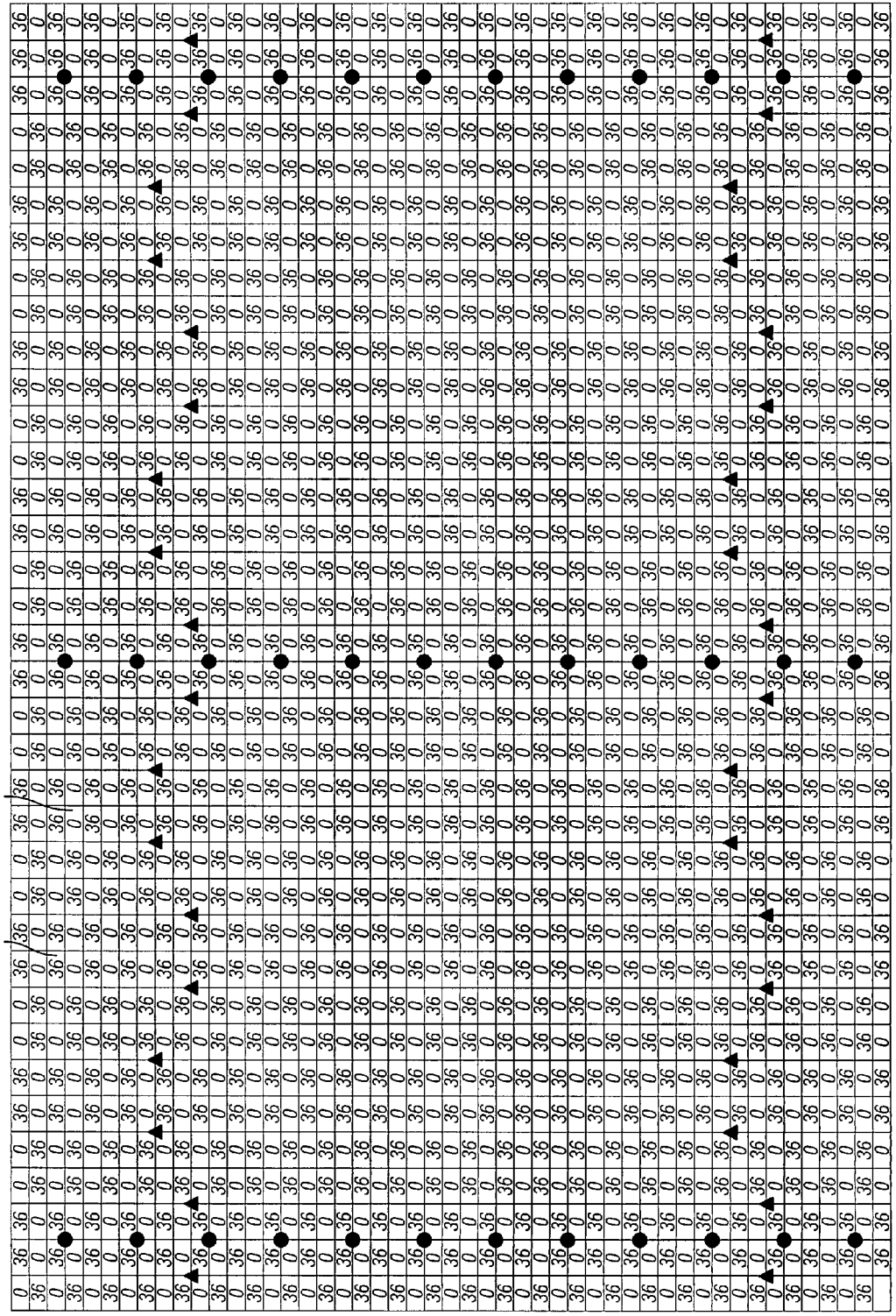
FIG. 8B illustrates the resulting folds in the fractionated sub-bins corresponding to FIG. 8A.
Figure 9A:
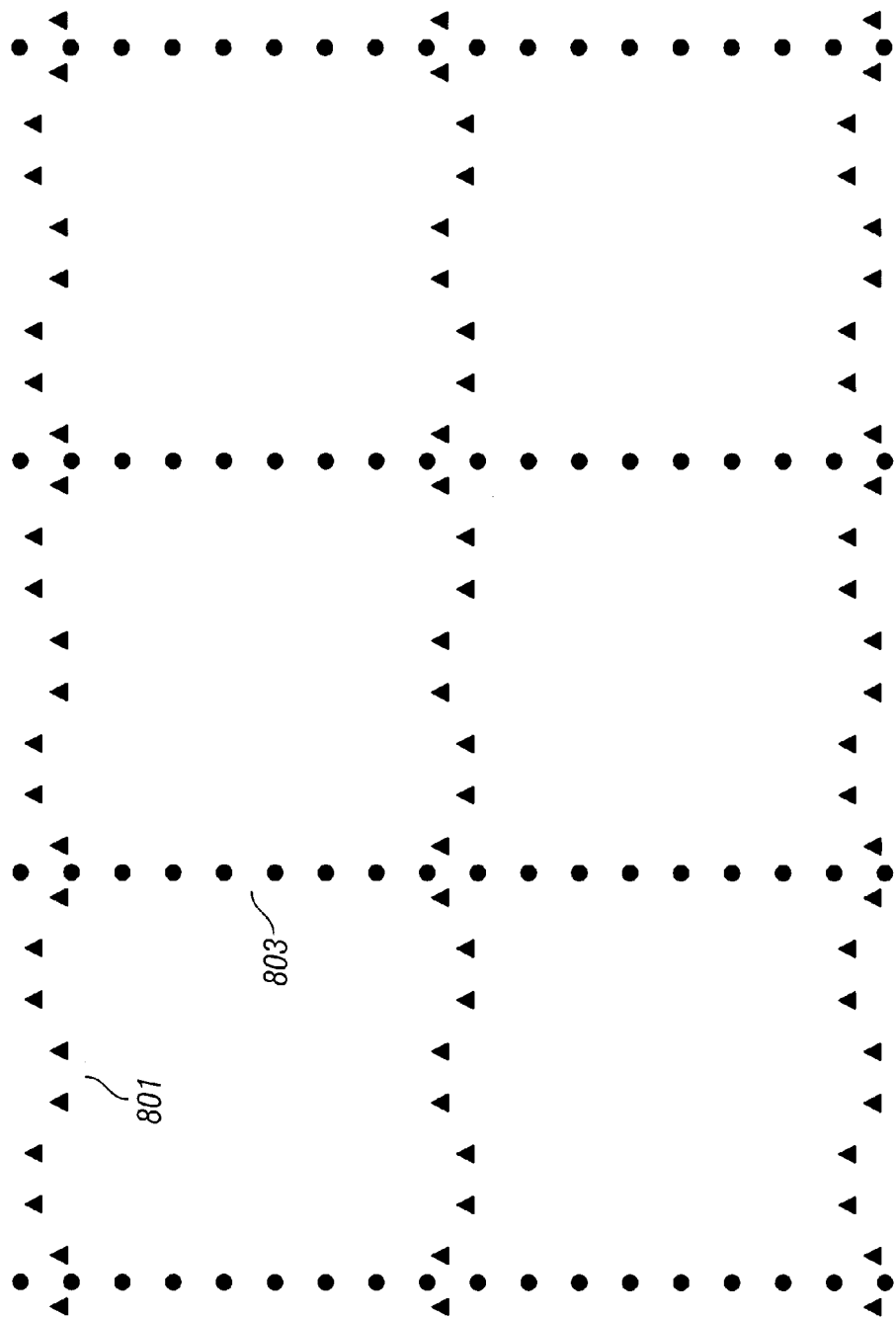
FIG. 9A illustrates a mirrored square source line perturbation with a period of four.
Figure 9B:
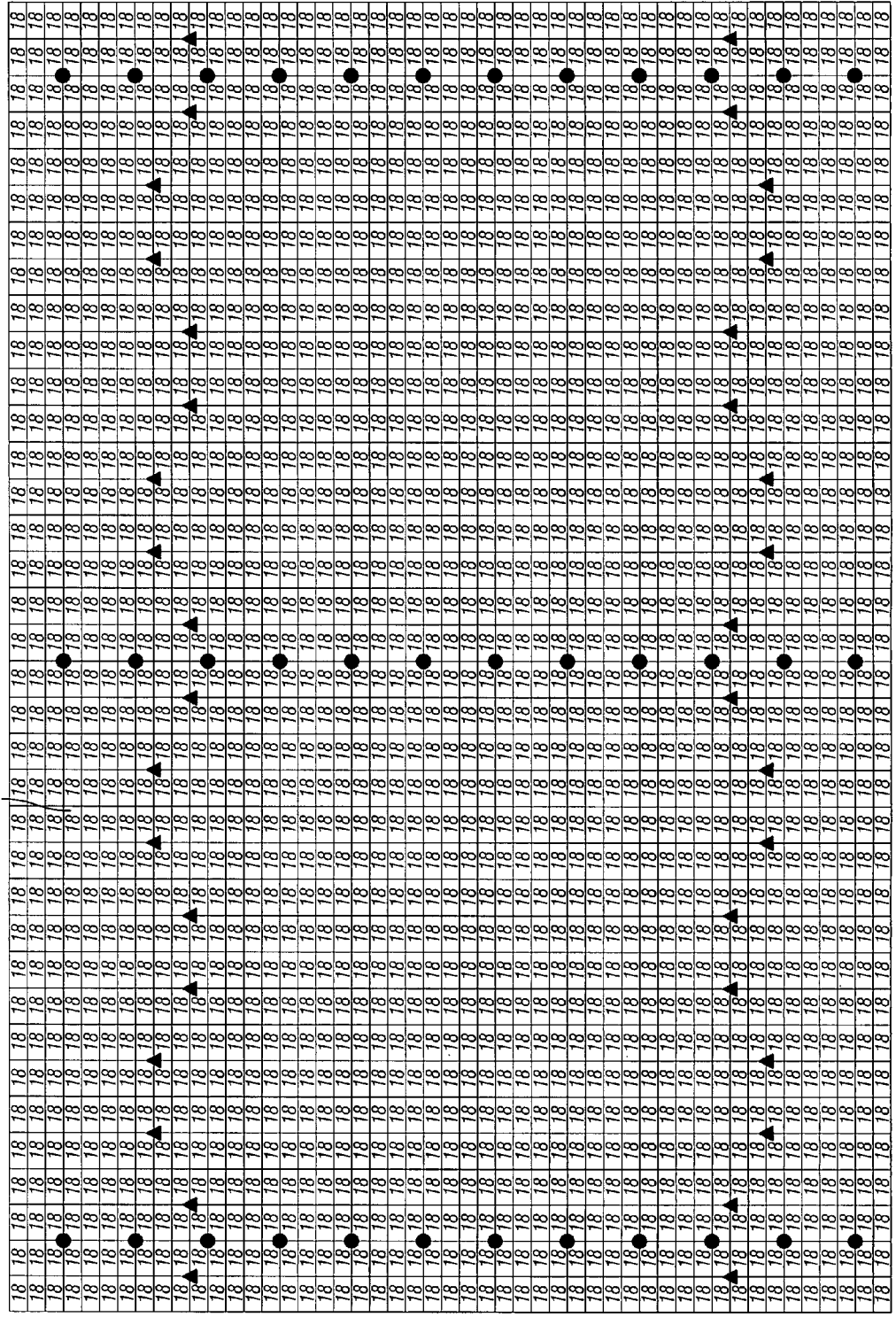
FIG. 9B illustrates the resulting folds in the fractionated sub-bins corresponding to FIG. 9A.

An example of the utilization of mirroring in the invention is shown in FIGS. 8A through 9B. In these cases, the source lines 801, with individual sources 802 shown as triangles, are perturbed, while the receiver lines 803, with individual receivers 804 shown as circles, are not perturbed (as will be in FIGS. 8A through 17A). This choice of which line to perturb is not a limitation of the invention, as discussed above. FIGS. 8A and 9A illustrate a square source line perturbation pattern in which each period (of four) of the perturbation comprises two sources 805 on the source line baseline alternating with two sources 806 equally offset from the source line baseline. FIGS. 8B and 9B illustrate the resulting folds in the fractionated sub-bins corresponding to FIGS. 8A and 9A, respectively. FIG. 8A shows the non-mirrored version of this pattern, in which adjacent source lines are identical. This source line perturbation pattern does not work, that is, does not yield consistently fractionated fold. As shown in FIG. 8B, half of the fractionated sub-bins 807 contain a fold of 36 while half of the fractionated sub-bins 808 contain a fold of 0. FIG. 9A shows the mirrored version of this pattern, in which adjacent source lines 801 are mirrored or phase shifted by 180°. As shown in FIG. 9B, this source line perturbation pattern does work, that is, does yield consistently fractionated fold. All of the fractionated sub-bins 901 contain the same fold of 18.

Figure 10A:
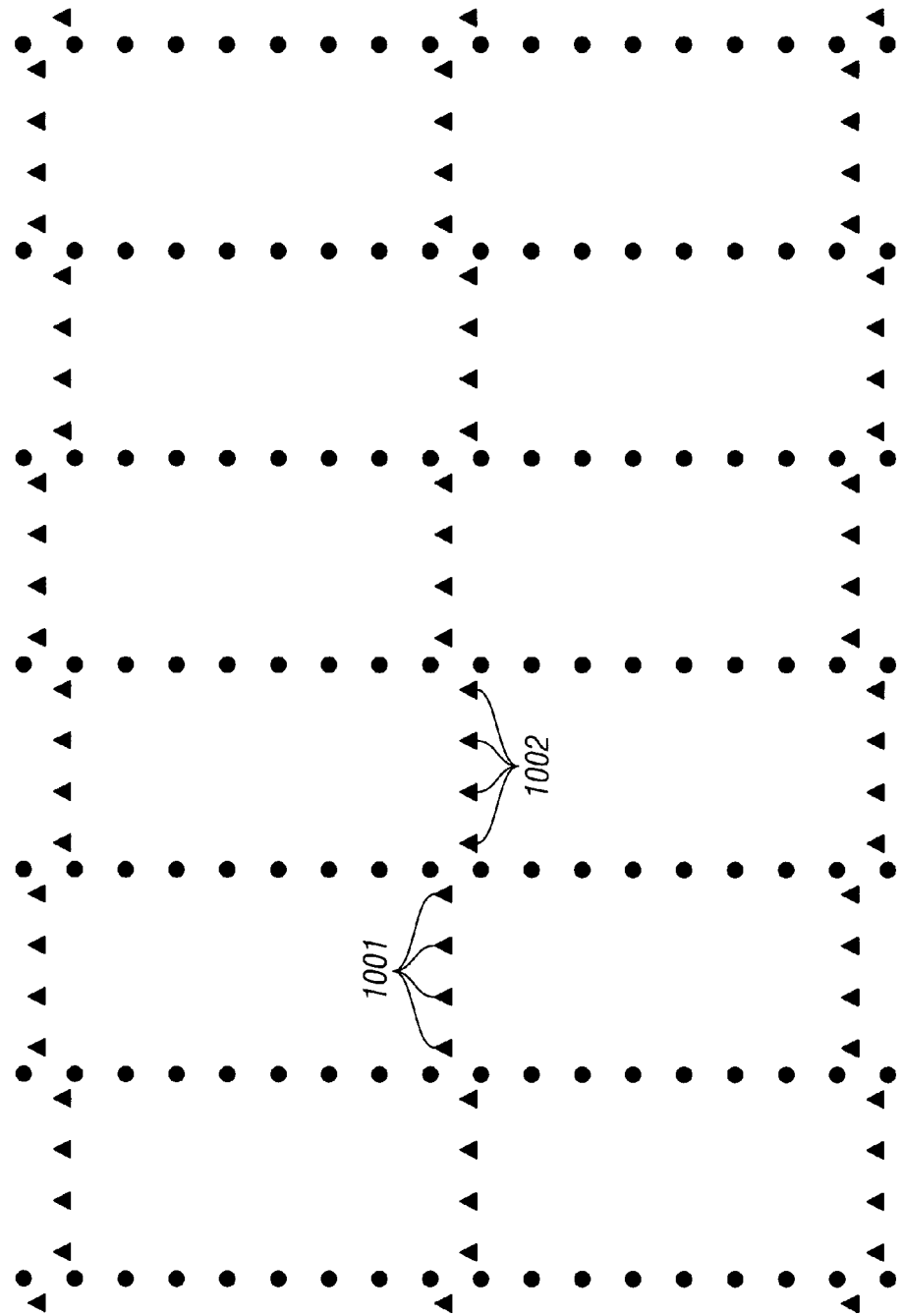
FIG. 10A illustrates a non-mirrored square source line perturbation with a period of eight.
Figure 10B:
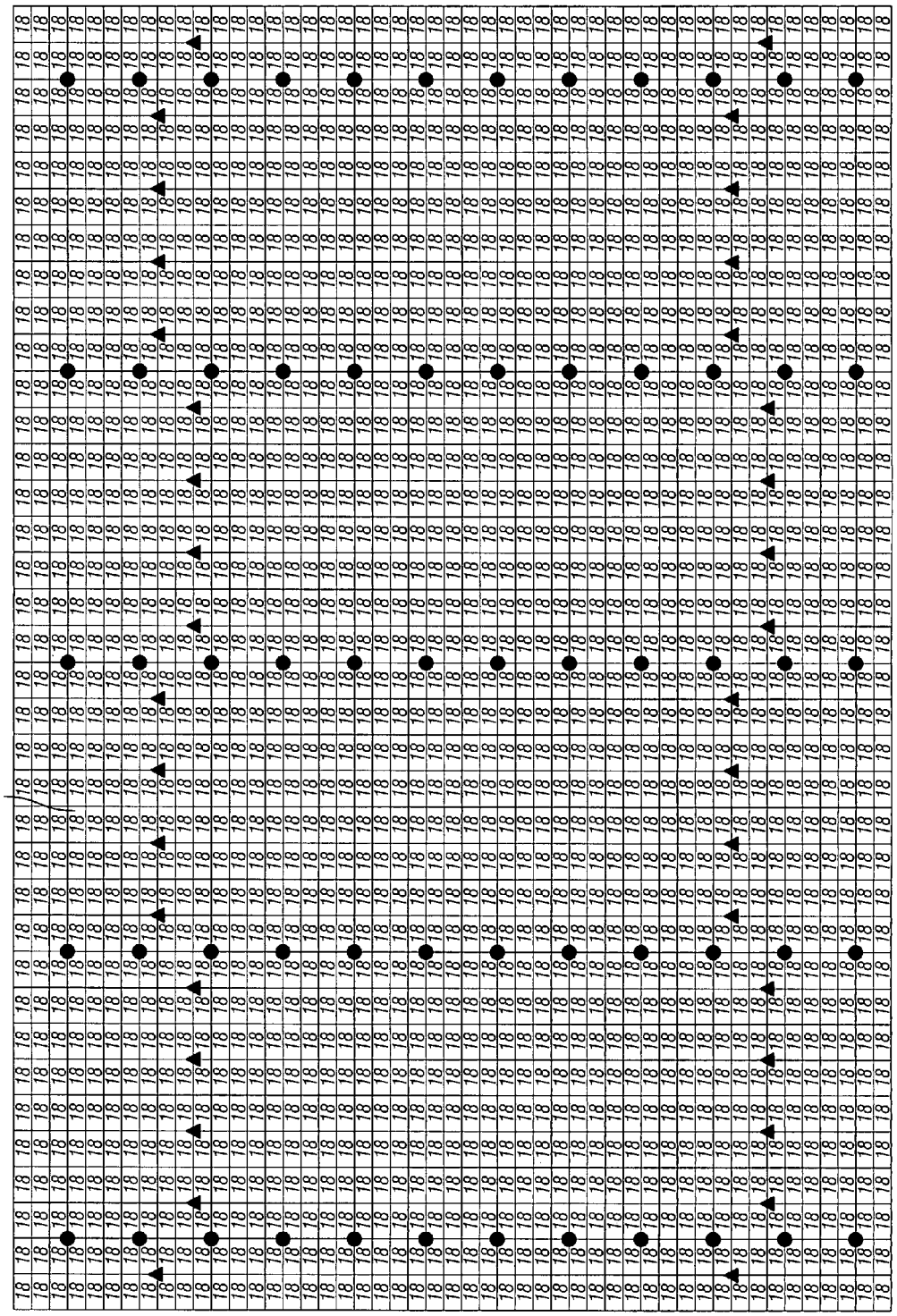
FIG. 10B illustrates the resulting folds in the fractionated sub-bins corresponding to FIG. 10A with a 12 line recording patch.
Figure 10C:
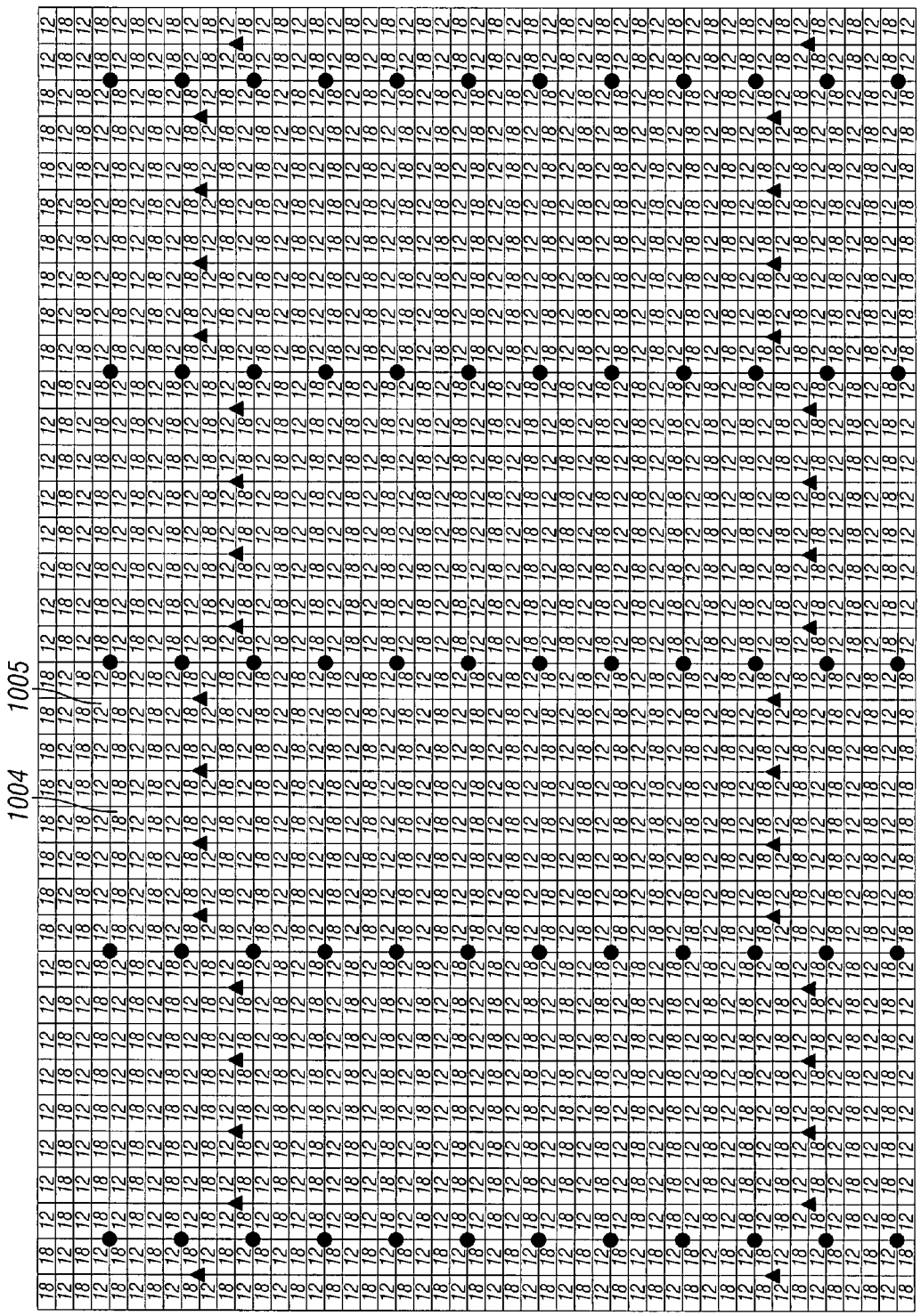
FIG. 10C illustrates the resulting folds in the fractionated sub-bins corresponding to FIG. 10A with a 10 line recording patch.

A third factor is the inline fold or the crossline fold of the recording patch employed in the survey. For example, FIG. 10A shows a square source line perturbation pattern similar to that in FIGS. 8A and 9A, except that each period (of eight) of the perturbation now comprises four sources 1001 on the source line baseline alternating with four sources 1002 equally offset from the source line baseline. FIG. 10B illustrates the resulting folds in the fractionated sub-bins corresponding to FIG. 10A for a 12 line, 96 receiver recording patch. As shown in FIG. 10B, employing a 12 line patch yields consistently fractionated bins 1003 with the same fold of 18 in every fractionated sub-bin. FIG. 10C illustrates the resulting folds in the fractionated sub-bins corresponding to FIG. 10A for a 10 line, 96 receiver recording patch. As shown in FIG. 10C, employing a 10 line patch for the same source line perturbation pattern as in FIG. 10B does not yield consistently fractionated fold. Half of the fractionated sub-bins 1004 contain a fold of 18 while half of the fractionated sub-bins 1005 contain a fold of 12.

A fourth factor, stated for the case of source line perturbation, is the ratio of the size of the period of the source line perturbation pattern with respect to the size of the receiver line interval. This receiver line interval can be either an integer or non-integer multiple of the period of source line perturbation pattern. Similarly, for receiver line perturbation, the source line interval can be either an integer or non-integer multiple of the period of receiver line perturbation pattern. In this situation, crossline fold contributions are made from adjacent source lines.

Figure 11A:
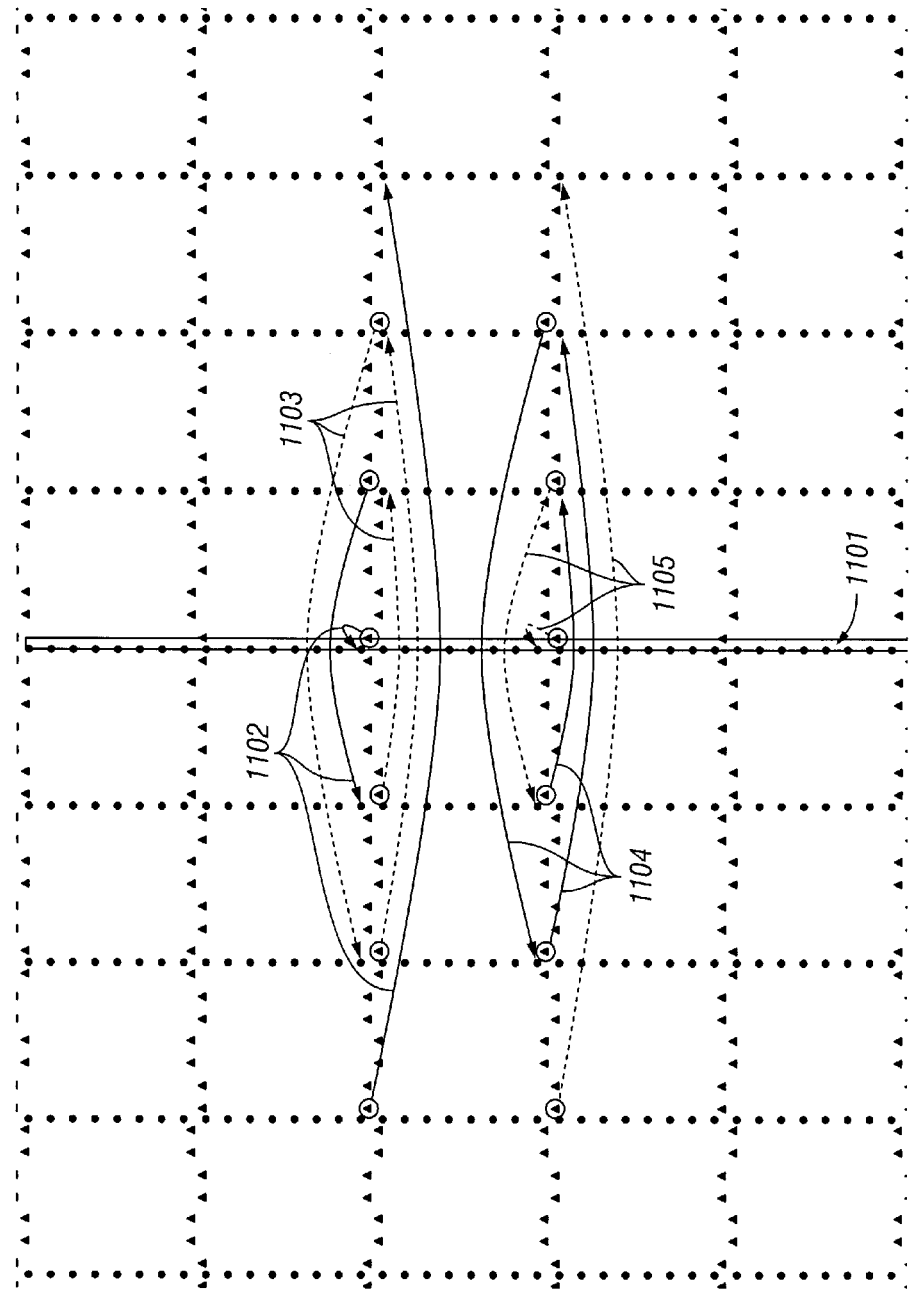
FIG. 11A illustrates a mirrored square source line perturbation with a period of four and a non-integer ratio of receiver line interval to perturbation period for a 12 line recording patch.

An example of the influence of the integer and non-integer multiples in the utilization of this fourth factor for the production of consistently fractionated fold is shown in FIGS. 9A and 11A, respectively. The source line perturbation pattern shown above in FIG. 9A above is a square pattern with a period of 880 ft. This is the integer multiple version, since the receiver line interval, LR=1760 ft., is an integer multiple, equal to 2, of the source line perturbation period, 880 ft. The result, as seen above in FIG. 9B, is that all of the fractionated sub-bins contain the same fold of 18. Recall that FIG. 9A is the mirrored version of this source line perturbation shown in FIG. 8A. In this case, mirroring is also necessary to make this source line perturbation work.

Figure 11B:
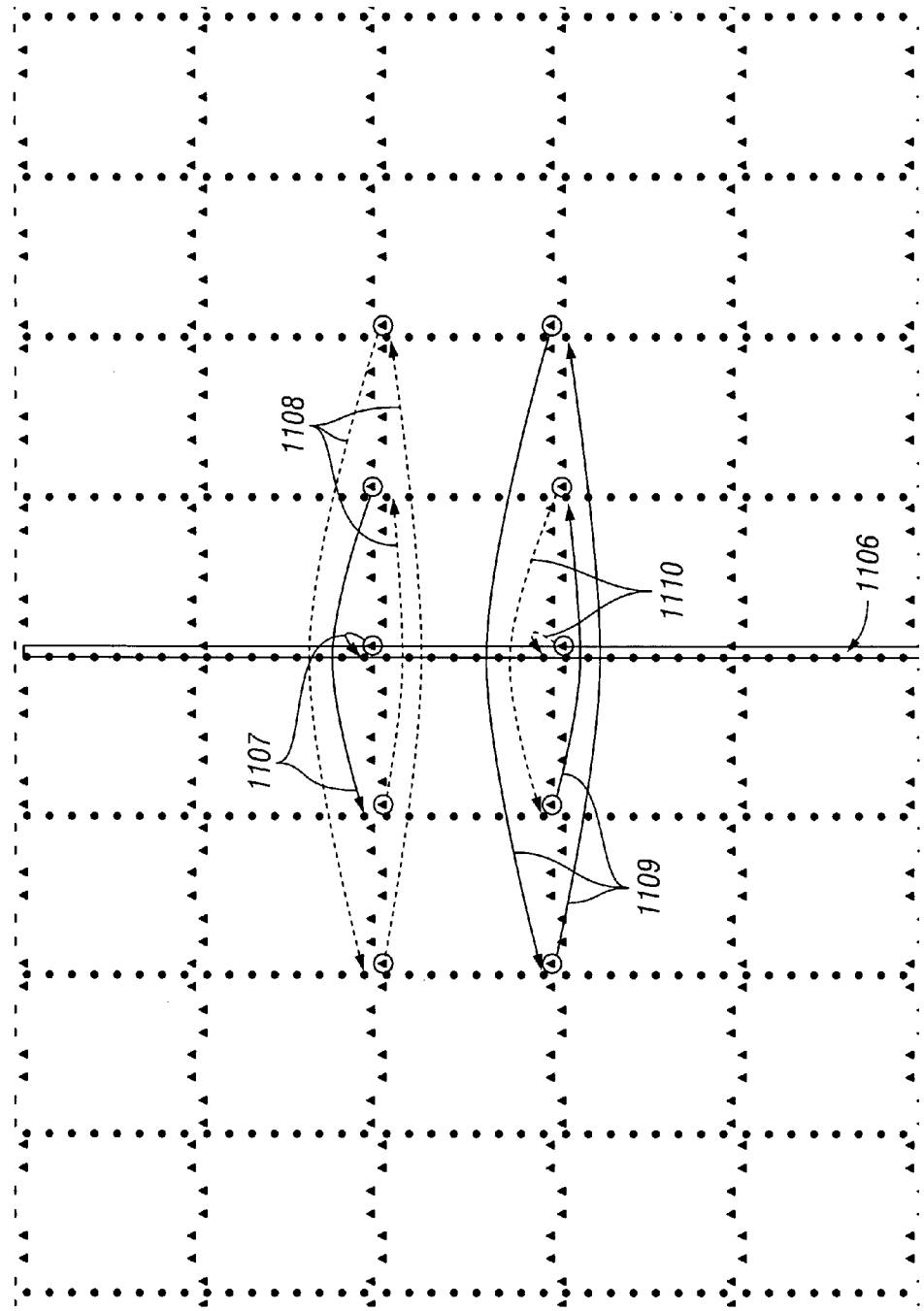
FIG. 11B illustrates a mirrored square source line perturbation with a period of four and a non-integer ratio of receiver line interval to perturbation period for a 10 line recording patch.

FIG. 11A shows the non-integer multiple version of this fourth factor for the same square source line perturbation shown in FIG. 9A. FIG. 11A illustrates the case with a 12 line recording patch, while FIG. 11B illustrates this case with a 10 line recording patch. In this case, the source intervals SS and source line intervals LS remain at 220 ft and 1760 ft, respectively. However, while the receivers still have 220 ft receiver group intervals SR, the receiver line intervals LR are changed from 1760 ft to 1540 ft. The period of the source line perturbation is still 880 ft., so the ratio of the receiver line interval, LR=1540 ft., to the source line perturbation period is now a non-integer multiple equal to 1.75. Nonetheless, for a recording patch of 12 lines with 96 receivers, this source line perturbation successfully splits the bins equally in half in the inline direction, with all of the fractionated sub-bins 901 containing the same fold of 18, just as was shown in FIG. 9B for the integer multiple version shown in FIG. 9A. Again, mirroring is necessary to make this source line perturbation work. Because the adjacent source lines are mirrored, the sources from every other source line contribute to the halved inline fold in the fractionated sub-bins.

The even crossline fold, equal to 6, also helps to make this non-integer multiple perturbation work. This even crossline fold comes from utilizing a 12 line, 96 receiver recording patch. FIG. 11A shows the crossline fold contributions for one CMP line coming from adjacent source lines. For the CMP line 1101 under consideration, the six fold contributions shown in the upper half of FIG. 11A comprise three shot positions 1102 staggered upward (solid lines) in the square source line perturbation combined with three shot positions 1103 staggered downward (dotted lines). Similarly, the six fold contributions shown in the lower half of FIG. 11A comprise three shot positions 1104 staggered upward (solid lines) in the square source line perturbation combined with three shot positions 1105 staggered downward (dotted lines).

A 10 line, 96 receiver recording patch gives an odd crossline fold equal to 5. Such a perturbation splits the inline fold bin dimension, but contributes uneven fold to the fractionated sub-bins. This perturbation pattern by itself would not yield consistently fractionated bins. If, however, the source lines are mirrored and, additionally, the inline fold is designed to be an even number, then the adjacent source lines will alternate the uneven fold contributions and yield consistently fractionated bins. This result for the 10 line recording patch is shown in FIG. 11B. For the CMP line 1106 under consideration, the five fold contributions shown in the upper half of FIG. 11B comprise two shot positions 1107 staggered upward (solid lines) in the square source line perturbation combined with three shot positions 1108 staggered downward (dotted lines). Conversely, the five fold contributions shown in the lower half of FIG. 11B comprise three shot positions 1109 staggered upward (solid lines) in the square source line perturbation combined with two shot positions 1110 staggered downward (dotted lines).

This last example interaction is an illustration of a general principle present in the method of the invention. When both source and receiver line perturbations are employed together, the above factors can interact to either relax or further constrain the perturbation parameters necessary to obtain consistent fold in the fractionated bins.

Figure 12:
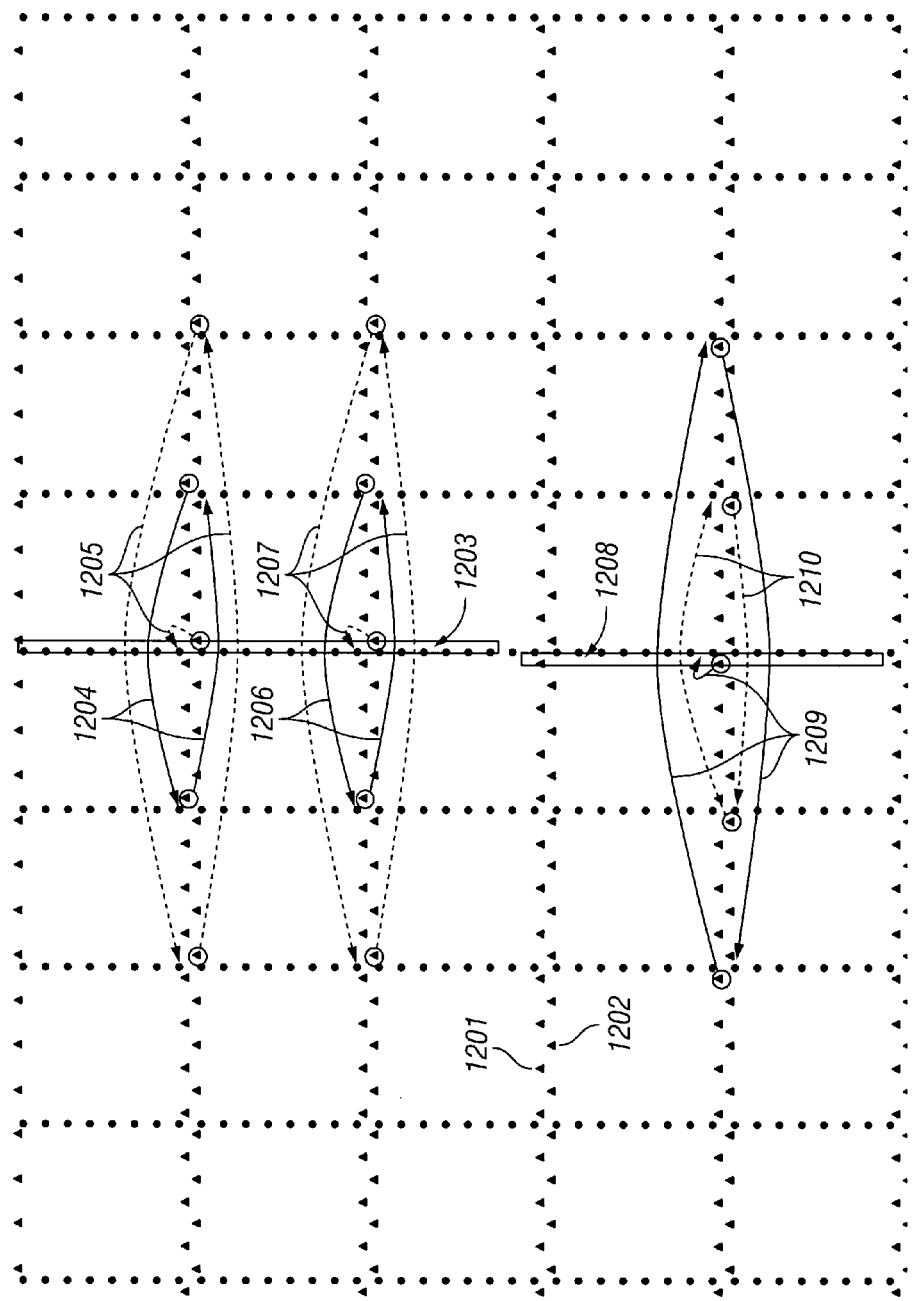
FIG. 12 illustrates a non-mirrored zigzag source line perturbation with a period of two and a non-integer ratio of receiver line interval to perturbation period for a 10 line recording patch.
Figure 13A:
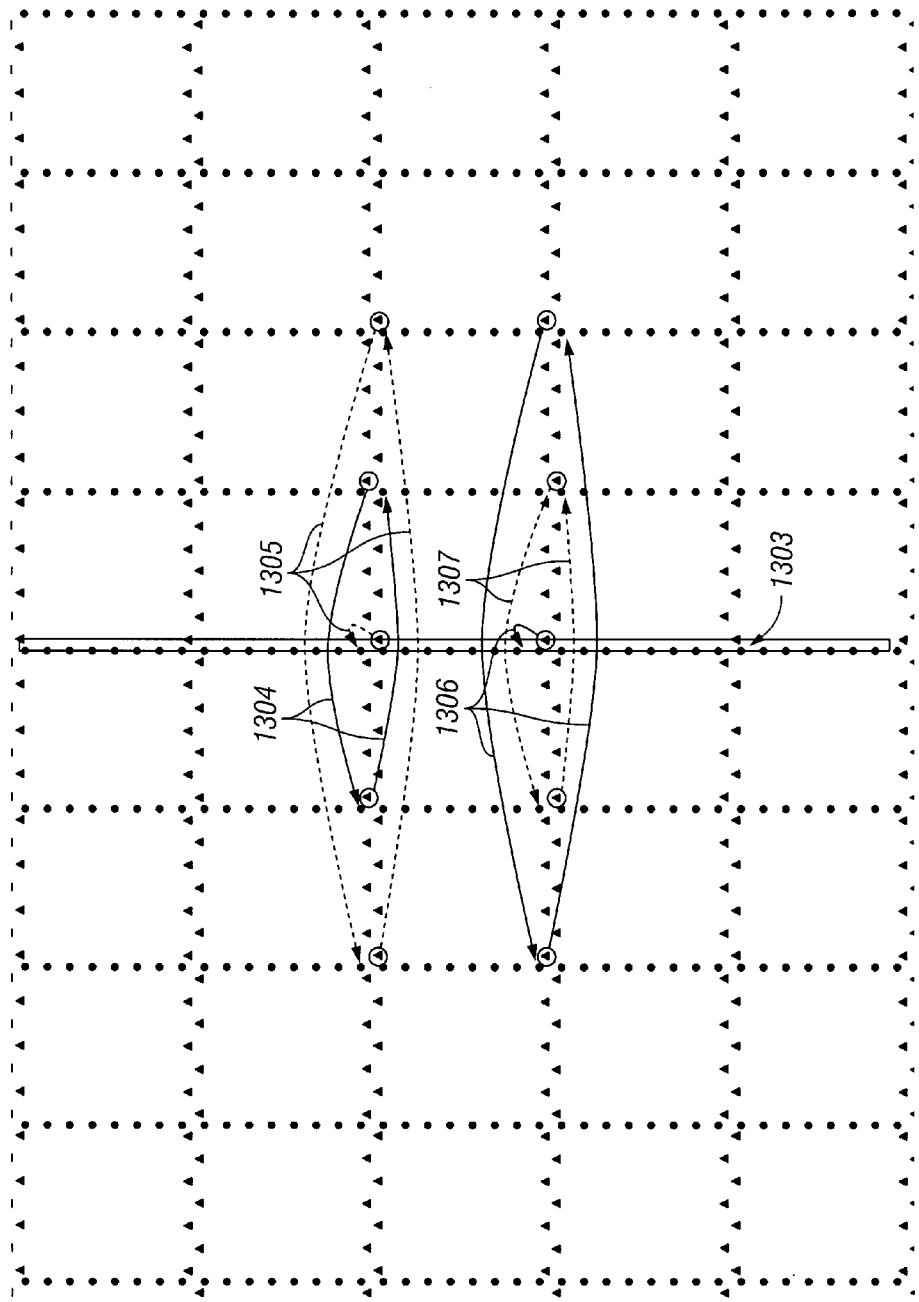
FIG. 13A illustrates a mirrored zigzag source line perturbation with a non-integer ratio of receiver line interval to perturbation period for a 10 line recording patch.
Figure 13B:
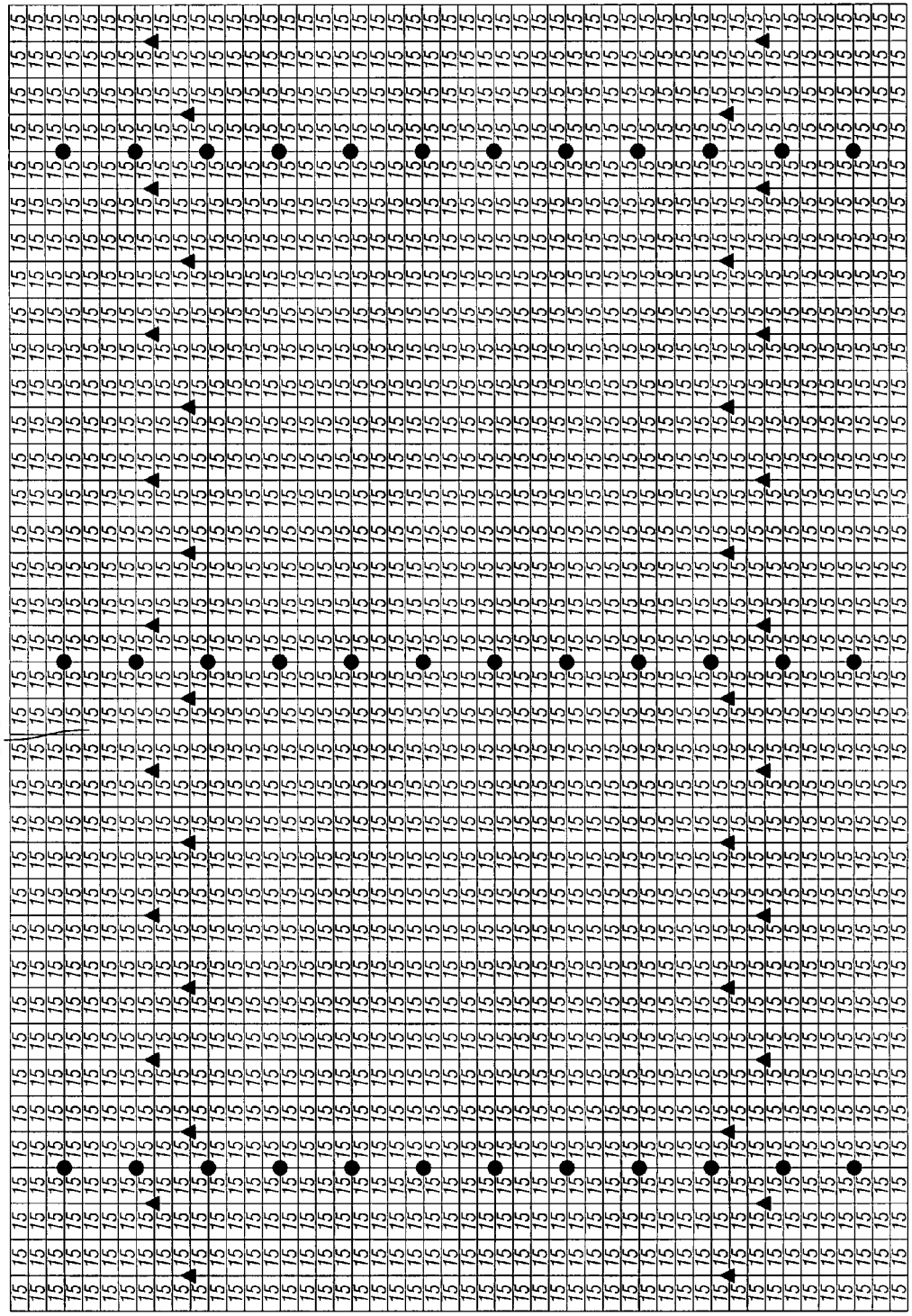
FIG. 13B illustrates the resulting folds in the fractionated sub-bins corresponding to FIG. 13A.

Another example of the interaction between the second, third, and fourth factors is shown in FIGS. 12 through 13B. FIGS. 12 and 13A illustrate a simple zigzag source line perturbation pattern in which each period (of two) of the perturbation comprises one source 1201 on the source line baseline alternating with one source 1202 offset from the source line baseline. The receiver line interval, LR=1540 ft, is a non-integer multiple, equal to 3.5, of the period of the source line perturbation, 440 ft. FIG. 12 shows the case in which adjacent source lines are not mirrored. With a 10 line, 96 receiver recording patch, this design will not consistently fractionate the bins due to an odd crossline fold contribution which does not have a complimentary uneven fold contribution, just as in the case illustrated in FIG. 11B. For the CMP line 1203 under consideration, the upper five fold contributions in FIG. 12 comprise two shot positions 1204 staggered upward (solid lines) in the zigzag source line perturbation combined with three shot positions 1205 staggered downward (dotted lines), while the lower five fold contributions also comprise two shot positions 1206 staggered upward (solid lines) combined with three shot positions 1207 staggered downward (dotted lines). For the adjacent CMP line 1208, the five fold contributions comprise three shot positions 1209 staggered upward (solid lines) combined with two shot positions 1210 staggered downward (dotted lines). FIG. 13A shows the case in which adjacent source lines are mirrored. Now, in FIG. 13A, for the CMP line 1303 under consideration, the upper five fold contributions comprise two shot positions 1304 staggered upward (solid lines) in the zigzag source line perturbation combined with three shot positions 1305 staggered downward (dotted lines), while the lower five fold contributions comprise three shot positions 1306 staggered upward (solid lines) combined with two shot positions 1307 staggered downward (dotted lines). Thus, the 10 line patch will provide consistently fractionated bins with fold equal to 15 in each fractionated sub-bin 1308, as shown in FIG. 13B.

Figure 14:
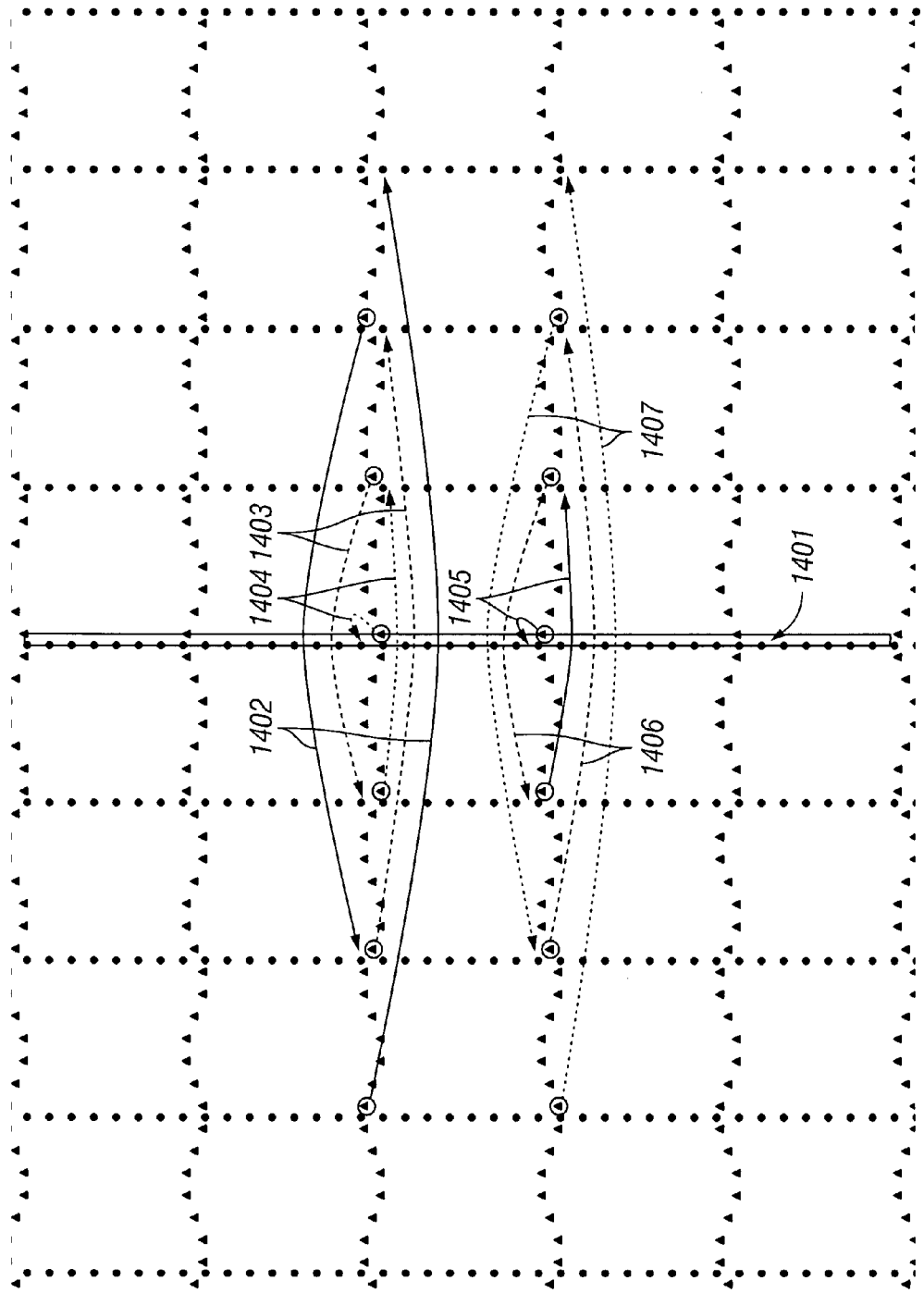
FIG. 14 illustrates a zigzag source line perturbation of period six with a non-integer ratio of receiver line interval to perturbation period and a 180° phase shift between adjacent source lines for a 12 line recording patch.

Yet another example of the interaction between the second, third, and fourth factors is shown in FIG. 14. FIG. 14 illustrates a zigzag source line perturbation pattern which has a period of six rather than the period of two, as in the simple zigzag pattern shown in FIGS. 12 and 13A. The receiver line interval, LR=1540 ft, is a non-integer multiple of the period of the source line perturbation, 1320 ft. In addition, adjacent source lines are mirrored. For the CMP line 1401 under consideration, the upper six crossline fold contributions in FIG. 14 comprise the combination of two shot positions 1402 staggered upward (solid lines) in the zigzag source line perturbation, two shot positions 1403 staggered in the middle (dashed lines), and two shot positions 1404 staggered downward (dotted lines), while the lower six fold contributions also comprise two shot positions 1405 staggered upward (solid lines), two shot positions 1406 staggered in the middle (dashed lines), and two shot positions 1407 staggered downward (dotted lines). As in the previous example in FIGS. 11A and 11B, this source line perturbation will provide consistently fractionated bins with a 12 line, 96 receiver recording patch, but not with a 10 line, 96 receiver patch. The 12 line patch works because the non-fractionated crossline fold of 6 is divisible by the bin fractionation of 3 in this case. This example leads to another factor that can be applied in the method of the invention.

A fifth factor, stated for source line perturbation, is how the pattern of source line perturbation varies at the intersection with receiver lines. A similar factor for receiver line perturbation is how the pattern of receiver line perturbation varies at the intersection with source lines. An equivalent way to state this factor is in terms of the amount of phase shift between adjacent source or receiver lines, respectively. As seen above, mirroring is a phase shift of 180° between adjacent lines. The following example shows a phase shift of 1200 between adjacent lines.

Figure 15:
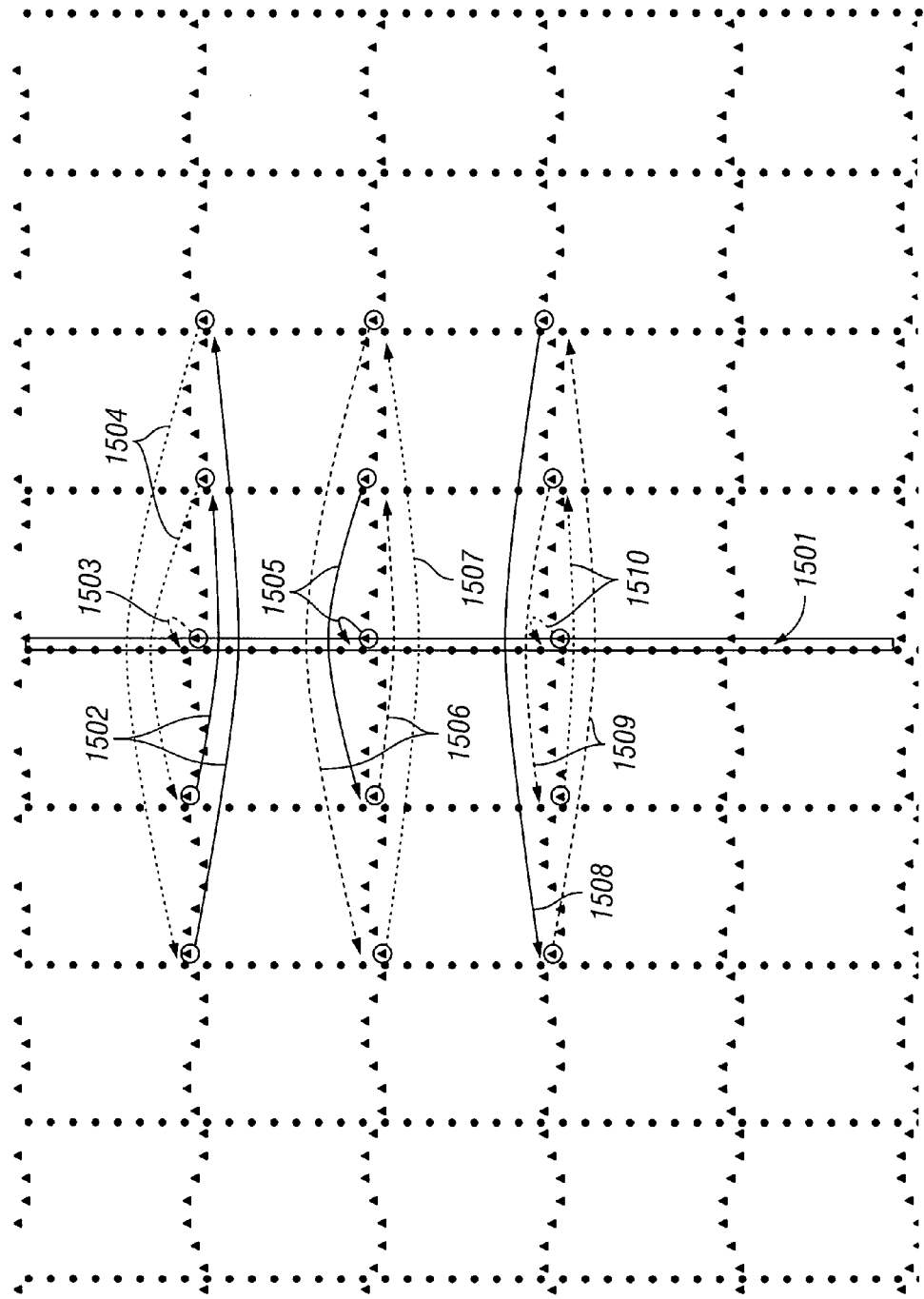
FIG. 15 illustrates a zigzag source line perturbation of period six with a non-integer ratio of receiver line interval to perturbation period and a 120° phase shift between adjacent source lines for a 10 line recording patch.

FIG. 15 shows the same zigzag source line perturbation as shown in FIG. 14, except that the adjacent source lines are shifted 120° instead of 180°. Now, a 10 line, 96 receiver recording patch does yield consistently fractionated bins, unlike the case shown in FIG. 12 above. For the CMP 1501 line under consideration, the upper five fold contributions in FIG. 15 comprise the combination of two shot positions 1502 staggered upward (solid lines) in the zigzag source line perturbation, one shot position 1503 staggered in the middle (dashed line), and two shot positions 1504 staggered downward (dotted lines). The middle five fold contributions in FIG. 15 comprise the combination of two shot positions 1505 staggered upward (solid lines) in the zigzag source line perturbation, two shot positions 1506 staggered in the middle (dashed lines), and one shot position 1507 staggered downward (dotted line). The lower five fold contributions comprise one shot position 1508 staggered upward (solid line), two shot positions 1509 staggered in the middle (dashed lines), and two shot positions 1510 staggered downward (dotted lines)

Figure 16A:
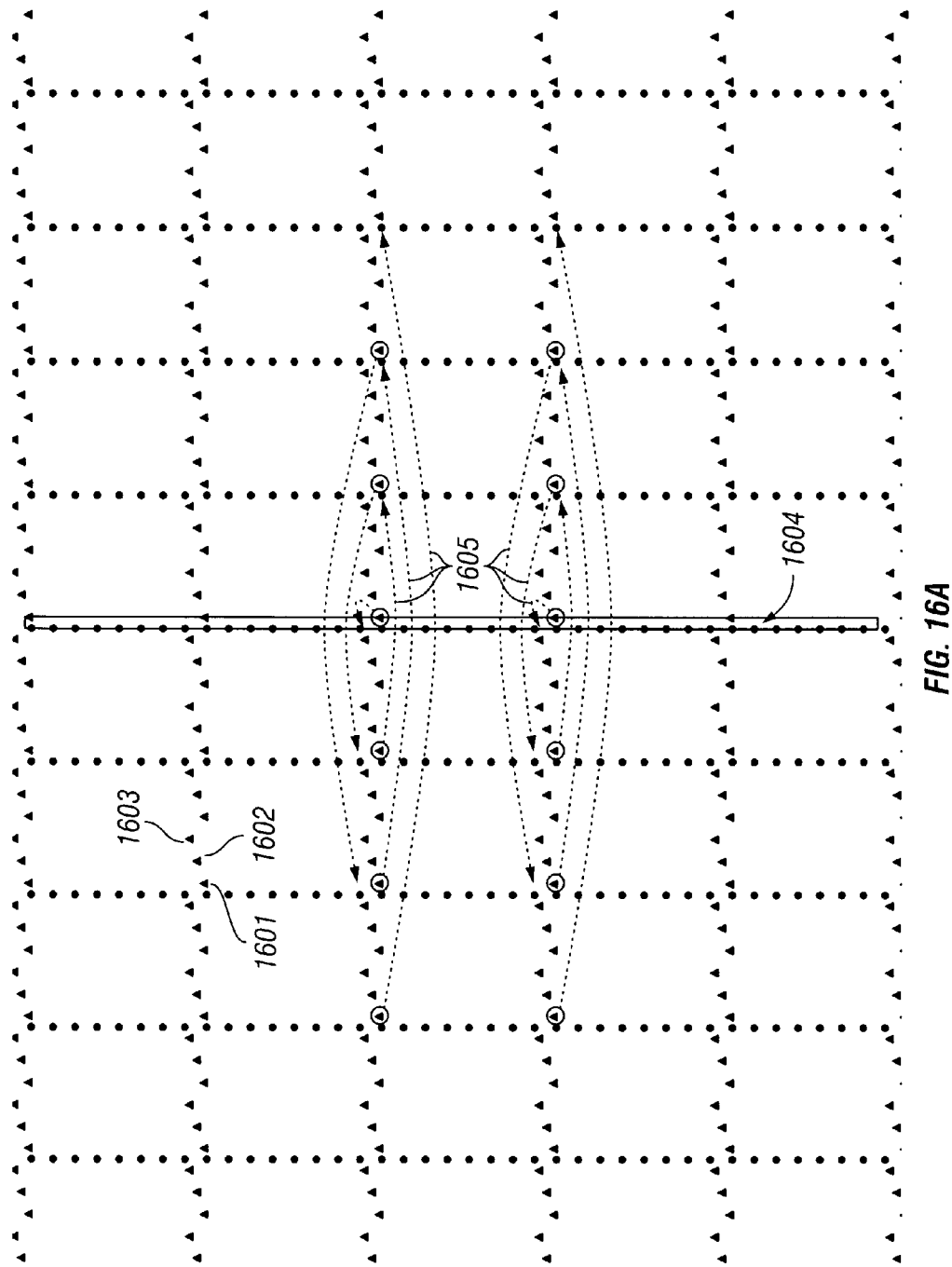
FIG. 16A illustrates a saw tooth source line perturbation of period three with a integer ratio of receiver line interval to perturbation period for a 12 line recording patch.
Figure 16B:
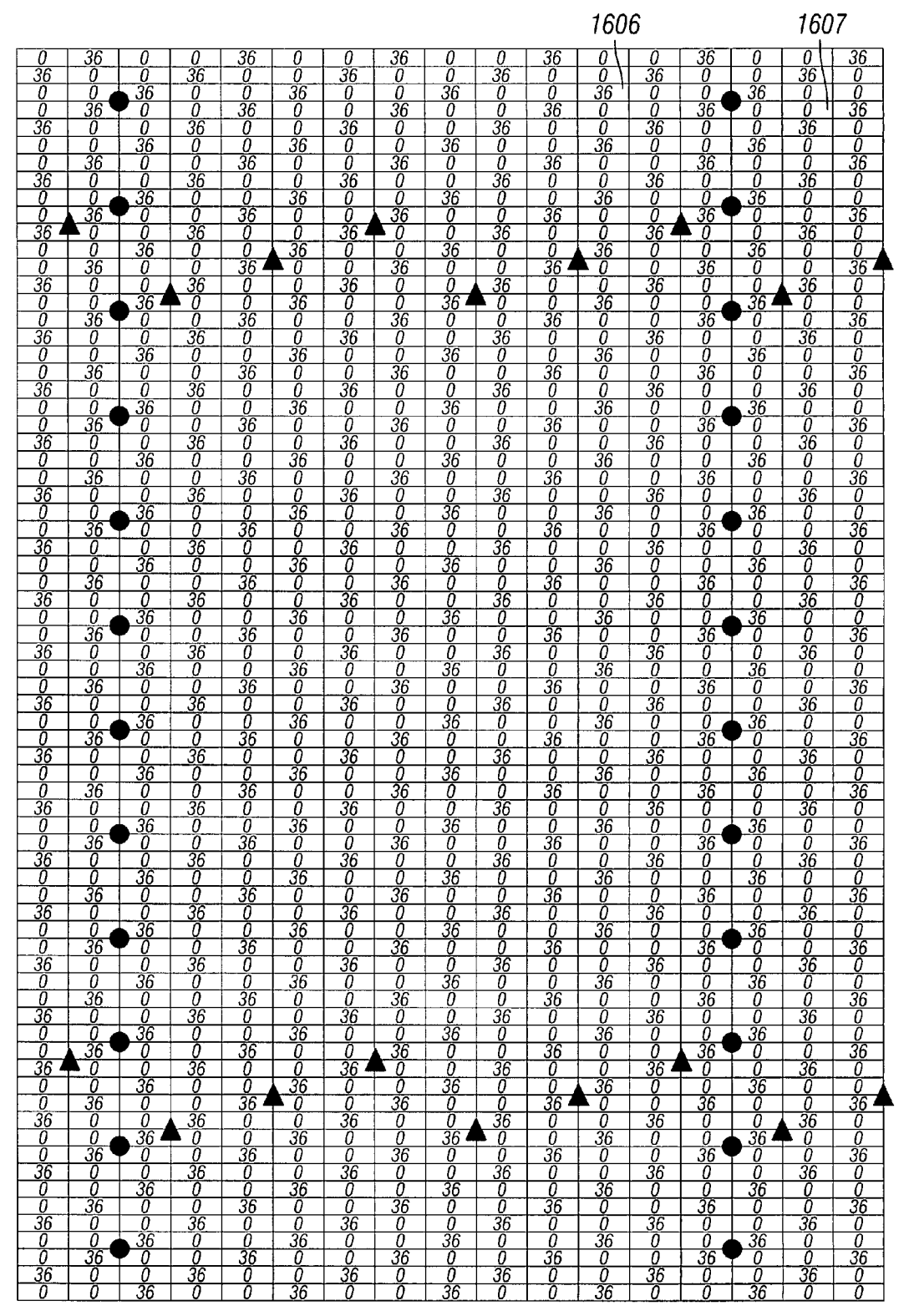

FIGS. 16A through 17B illustrate a saw tooth source line perturbation pattern in which each period (of three) of the perturbation comprises a first source 1601 offset to one side of the source line baseline, a second source 1602 on the baseline, and a third source 1603 offset equally to the other side of the baseline. FIG. 16A shows this source line perturbation without any phase shift. For the CMP line 1604 under consideration, both the upper and lower six fold contributions in FIG. 16A comprise six shot positions 1605 staggered downward (dotted lines). FIG. 16B illustrates the resulting folds in the fractionated sub-bins corresponding to FIG. 16A. A 12 line, 96 receiver recording patch will not consistently fractionate the bins, as shown in FIG. 16B. One third of the fractionated sub-bins 1606 contain a fold of 36 while the remaining two thirds of the fractionated sub-bins 1607 contain a fold of 0.

Figure 17A:
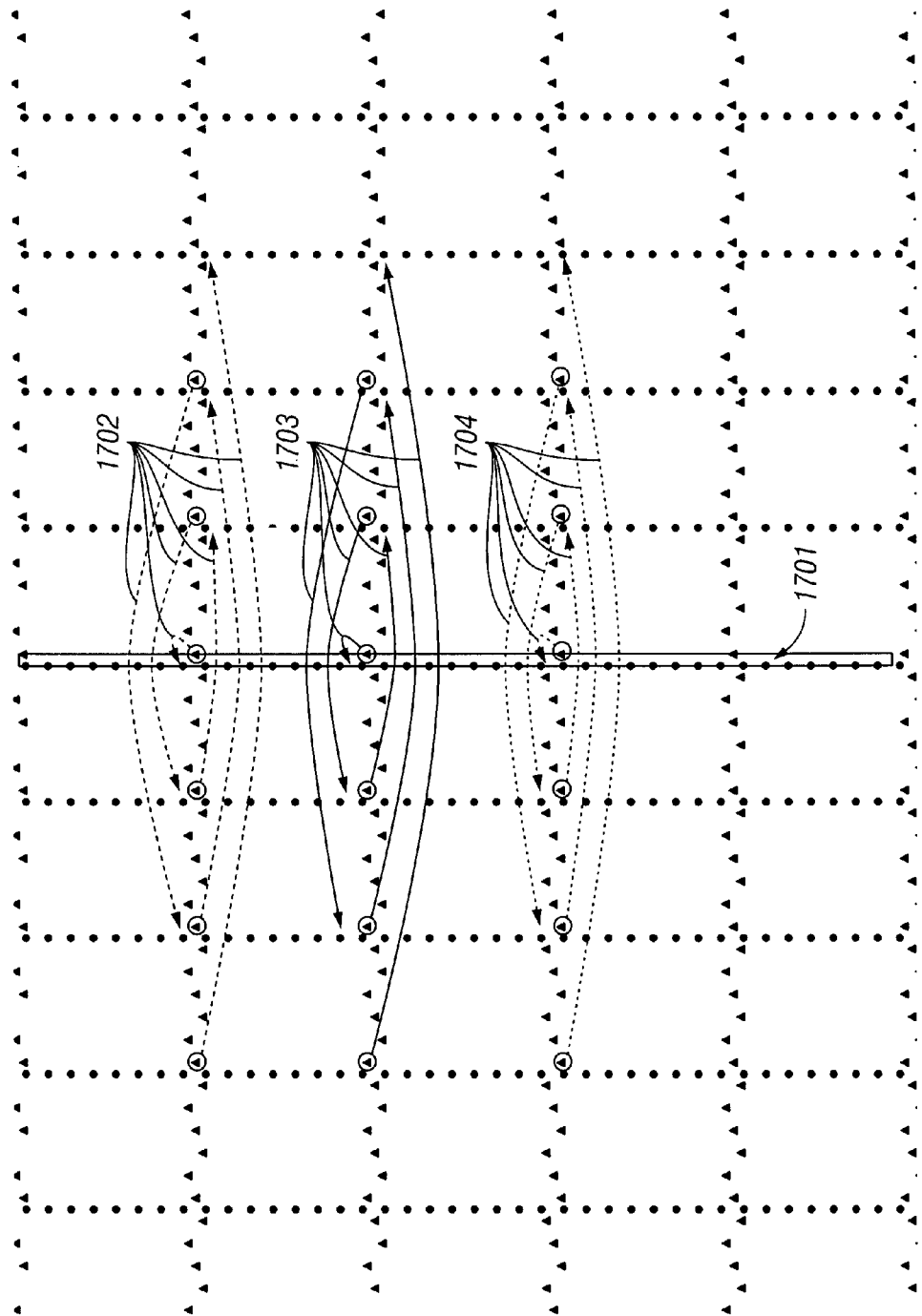
FIG. 17A illustrates a saw tooth source line perturbation of period three with a integer ratio of receiver line interval to perturbation period and a 120° phase shift between adjacent source lines for a 12 line recording patch.
Figure 17B:
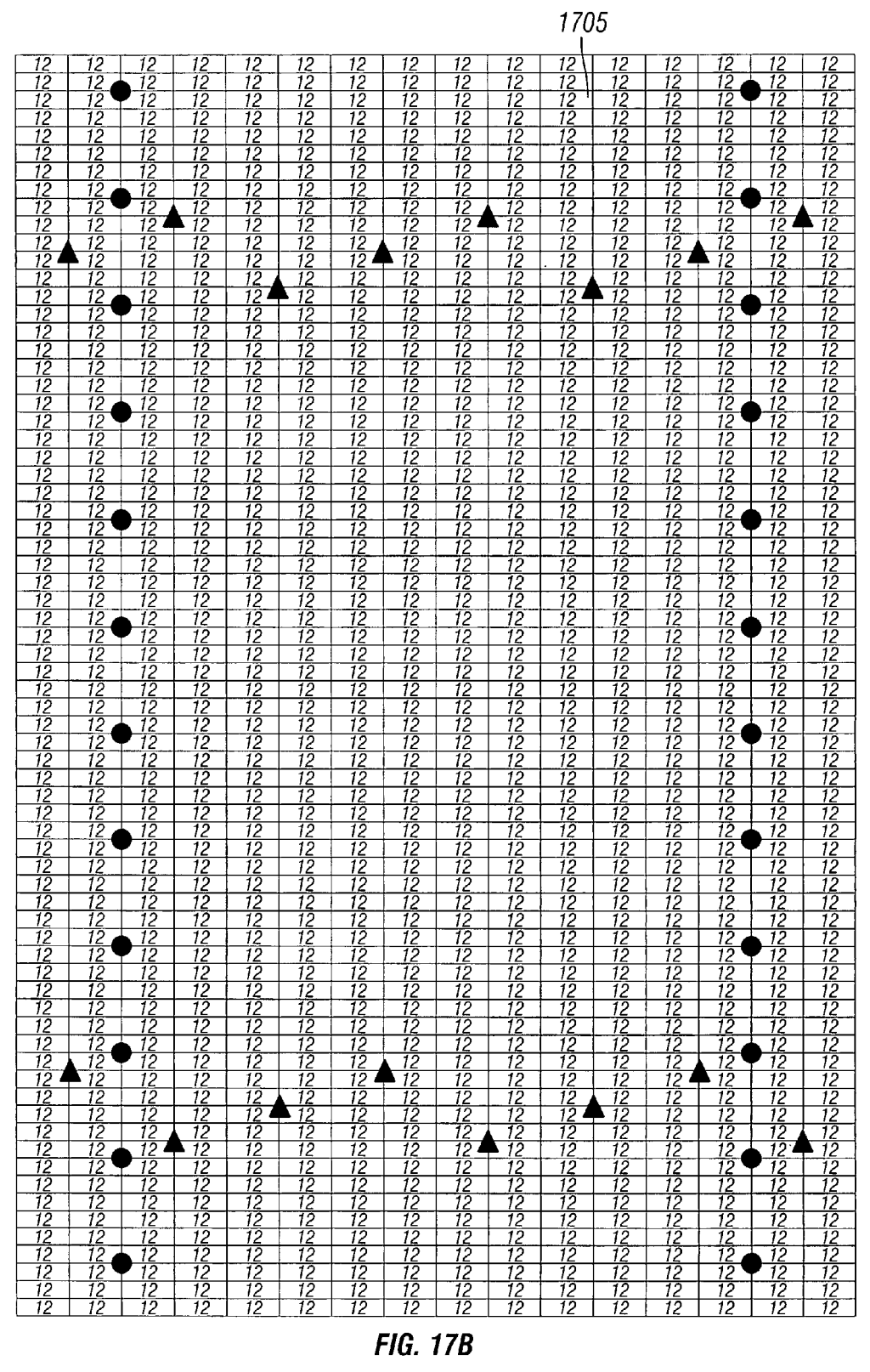

FIG. 17A shows the same perturbation pattern as shown in FIG. 16A, except that now adjacent source lines are phase shifted by 120°, which amounts to 220 ft. Now, for the CMP line 1701 under consideration, the upper six fold contributions in FIG. 17A comprise six shot positions 1702 staggered in the middle (dashed lines), the middle six fold contributions comprise six shot positions 1703 staggered upward (solid lines), and the lower six fold contributions comprise six shot positions 1704 staggered downward (dotted lines). FIG. 17B illustrates the resulting folds in the fractionated sub-bins corresponding to FIG. 17A. With the receiver line interval being an integer multiple of the perturbation period, the 12 line patch provides consistently fractionated bins 1705 with fold equal to 12 in each fractionated sub-bin, as shown in FIG. 17B. In fact, even a 10 line, 96 receiver patch provides consistently fractionated bins. The 120° phase shift splits the inline fold, but does not split the crossline fold because the receiver line interval, LR=1320 ft, is an integer multiple, equal to 2, of the period of the source line perturbation, equal to 660 ft.

In the foregoing discussion, various bin fractionation methods have been described in the context of seismic surveys. The disclosed methods employ perturbation patterns that modulate receiver lines and source firing lines, thereby allowing for tighter spatial sampling of the subsurface. A secondary benefit is that the perturbation pattern avoids creating long straight sightlines thereby reducing the perceived environmental impacts in some survey regions. The disclosed methods enhance bin fractionation flexibility and may prove to be beneficial in any surveying method. The described methods may prove useful in contexts such as ultrasonic imaging, magnetic resonance imaging, radar imaging, and sonar imaging. For example, in the specific field of construction, data from radar or acoustic energy reflections can be gathered from buildings, bridges, airfields, dams or other large constructions, and the described methods may be advantageously applied for detecting cracks or other flaws.

Additionally, because the fractionation arises from the contributions of adjacent source and receiver points, the offset distribution provided by some of the embodiments of the invention will often be smoother than other fractionation methods which rely solely on the contributions of adjacent source and receiver lines.

Numerous variations and modifications will become apparent to those skilled in the art once the above disclosure is fully appreciated. For example, the seismic data may be presented in any form suitable for representing information regarding an area or volume of the earth. It is intended that the following claims be interpreted to embrace all such variations and modifications.

What is claimed is:

1. A method for providing even or uniform bin-fractionation for a three-dimensional seismic survey, comprising:
    deploying a receiver point arrangement having one or more receiver lines, each receiver line having receivers with substantially uniform inline spacing;
    triggering a seismic source at each source point in an arrangement of source points along one or more source lines, each source line having source points with substantially uniform crossline spacing; and collecting seismic data traces, each trace having an associated midpoint, wherein a perturbation pattern is applied to at least one of the receiver point arrangement and the source point arrangement to distribute the midpoints evenly within a bin having dimensions of half the receiver inline spacing and half the source crossline spacing across multiple locations within that bin, in which the fractionation in the crossline and inline directions is determined by the interaction between the number of offset positions in the receiver point arrangement and number of offset positions in the source point arrangement, respectively; phase shifts of the perturbation pattern between adjacent receiver lines and between adjacent source lines, respectively; and crossline and inline fold, respectively, of a recording patch employed.

2. The method of claim 1, wherein the fractionation in the crossline and inline directions is further determined by the ratios of a period of the receiver line perturbation pattern to an interval between source lines and the period of the source line perturbation pattern to an interval between receiver lines, respectively.

3. The method of claim 1, wherein the perturbation pattern is applied to the receiver point arrangement.

4. The method of claim 3, wherein the receiver point arrangement comprises multiple receiver lines each having the perturbation patter, and wherein the perturbation patterns for adjacent receiver lines have a nonzero phase shift.

5. The method of claim 1, wherein the perturbation pattern is applied to the source point arrangement.

6. The method of claim 5, wherein the source point arrangement comprises multiple source lines each having the perturbation pattern, and wherein the perturbation patterns for adjacent source lines have a nonzero phase shift.

7. The method of claim 1, wherein the pattern is a triangular wave pattern.

8. The method of claim 1, wherein the pattern is a stair-step pyramid pattern.

* * * * *